US011042525B2

(12) United States Patent
Das et al.

(10) Patent No.: US 11,042,525 B2
(45) Date of Patent: Jun. 22, 2021

(54) EXTRACTING AND LABELING CUSTOM INFORMATION FROM LOG MESSAGES

(71) Applicant: ORACLE INTERNATIONAL CORPORATION, Redwood Shores, CA (US)

(72) Inventors: Sreeji Das, Fremont, CA (US); Jae Young Yoon, San Mateo, CA (US); Dhileeban Kumaresan, Hyderabad (IN); Venktesh Alvenkar, Hyderabad (IN); Adrienne Wong, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 235 days.

(21) Appl. No.: 15/699,529

(22) Filed: Sep. 8, 2017

(65) Prior Publication Data

US 2018/0285432 A1    Oct. 4, 2018

Related U.S. Application Data

(60) Provisional application No. 62/481,297, filed on Apr. 4, 2017.

(51) Int. Cl.
*G06F 11/30* (2006.01)
*G06N 20/00* (2019.01)
(Continued)

(52) U.S. Cl.
CPC .......... *G06F 16/22* (2019.01); *G06F 11/3055* (2013.01); *G06F 16/23* (2019.01); *G06F 16/955* (2019.01); *G06N 20/00* (2019.01)

(58) Field of Classification Search
None
See application file for complete search history.

(56) References Cited

U.S. PATENT DOCUMENTS

| 7,107,338 | B1 * | 9/2006 | Nareddy | ................ H04L 67/22 709/224 |
| 7,603,709 | B2 * | 10/2009 | Lewis | ................ H04L 63/0227 726/23 |
| 10,685,114 | B2 * | 6/2020 | Scaife | ................ G06F 21/6218 |

OTHER PUBLICATIONS

Workspaces Mar. 20, 2015—Get Search Results Mar. 15, 2020, Microsoft, https://docs.microsoft.com/en-us/rest/api/loganalytics/workspaces%202015-03-20/getsearchresults.*

(Continued)

*Primary Examiner* — Jason G Liao
(74) *Attorney, Agent, or Firm* — Kilpatrick Townsend & Stockton LLP

(57) ABSTRACT

A set of field values corresponding to a set of underlying fields are extracted from individual log messages. A space of potential values for underlying field(s) is identified. The space of potential values is segmented into value subspaces. Each value subspace is automatically associated with a category name. A definition for the new categorical field is generated, which indicates how a categorical value of the new categorical field depends on value(s) of the underlying field(s). For each log message, a categorical value is determined for the new categorical field based on the definition and the one or more values of the one or more underlying fields extracted from the log message. A presentation is generated that represents, for each log message, the particular category name corresponding to the categorical value determined for the log message.

20 Claims, 18 Drawing Sheets

(51) Int. Cl.
　　　*G06F 16/22*　　　　(2019.01)
　　　*G06F 16/23*　　　　(2019.01)
　　　*G06F 16/955*　　　(2019.01)

(56) References Cited

OTHER PUBLICATIONS

Brodlie et al., Visualization Notations, Models and Taxonomies 07, EG UK Theory and Practice of Computer Graphics, 6 pages.*

Kreps, The Log: What every software engineer should know about real-time data's unifying abstraction Dec. 16, 2013, Linkedin, https://engineering.linkedin.com/distributed-systems/log-what-every-software-engineer-should-know-about-real-time-datas-unifying.*

Duda et al, Pattern Classification 2001, John Wiley, ppTOC, Preface, Chs 1.1-1.6, 3.8.*

Smith, A tutorial on Principlal Components Analysis Feb. 26, 2002, otago.ac.nz, http://www.cs.otago.ac.nz/cosc453/student_tutorials/principal_components.pdf.*

Baker et al., Extended Log File Format date unknown, W3C, WD-logfile-960323, http://www.w3.org/TR/WD-logfile-960323.*

Ghelani, Ketan, "Announcing the new and improved Azure Log Analytics", Microsoft Azure, dated Aug. 9, 2017, accessed from the internet: https://azure.microsoft.com/en-us/biog/announcing-the-now-and-improved-azure-log-anayticst.

Kobielus, James, "Big data log analysis thrives on machine learning", InfoWorld, dated Jun. 18, 2014, accessed from the internet: https://www.infoworld.com/article/2608084/big-data/big-data-log-analysis-thrives-on-machine-learning.html.

\* cited by examiner

EXTRACTING AND LABELING CUSTOM INFORMATION FROM LOG MESSAGES

CROSS-REFERENCE TO RELATED APPLICATIONS

This application claims the benefit of and the priority to U.S. Provisional Application No. 62/481,297, filed on Apr. 4, 2017, which is hereby incorporated by reference in its entirety for all purposes.

BACKGROUND

The simplest of events (e.g., logging into an account on the Internet) can result in generation of many log messages, such that total quantities of messages received and/or generated by various systems may be in the billions. The log messages may be generated by different applications, in different formats, associated with different times, use different signatures, pertain to different actions, and/or depend on performance of different devices. Thus, a collection of log messages (e.g., maintained for a given web site, set of user devices, etc.) can be large and complex.

Individual log messages may convey important information, such as data representing a performance characteristic of a computer system or task. Thus, even though log-message data sets are often complex and large, quickly and accurately detecting particular types of indicators (e.g., performance indicators) from the data can be essential to facilitating strong performance (e.g., by detecting a problem and addressing it via reallocating resources, implementing security measures and/or changing task definitions).

SUMMARY

In some embodiments, individual log messages are processed to detect, for each variable component of one or more variable components in the message, a value for the variable component. For example, a log message may identify a particular value associated with a query response time, memory usage, processor speed, etc. For a given variable component, values for the variable component may differ across a set of log messages (e.g., received from one or more sources and/or during one or more time periods). For example, a distribution of values across the set may include a normal, skewed or bimodal distribution. In some instances, for each message in the set, a label and/or text characteristics (e.g., a font color, font style or font size of a value, label or other is assigned to the message based at least in part on the value in the message. Assigning the label can include identifying which range of multiple automatically defined ranges includes the value, and retrieving a label associated with the range. For example, numeric processing-speed values may be converted into "good", "normal" and "bad" labels using the automatically defined ranges.

Thresholds (or one or more initial thresholds) that separate the ranges may be defined based on domain information indicating meaning of various values, a distribution of values over a set of messages, machine learning, etc. A user interface can be provided that accepts input that adjusts each of one or more initial, automatically defined thresholds, each of one or more initial, automatically-generated labels, and/or each of one or more initial, automatically-identified text characteristics. Upon defining one or more range characteristics (e.g., one or more range-separating thresholds and/or one or more labels), a display can be generated or updated that identifies—for each of one or more log messages—the label (e.g., based on automatically identified range definitions and/or range definitions adjusted based on user inputs) and/or text characteristic (e.g., based on automatically identified characteristic definitions and/or characteristic definitions adjusted based on user inputs). The display may be configured to receive particular input that triggers sorting by and/or filtering by a label and/or text characteristic. The display may further identify—for each of the one or more log messages—a value for the variable component, a value for each of one or more other variable components, and/or the full log message. Thus, a user may be able to selectively review log messages associated with particular labels and, in some instances, compare these log messages to one or more other log messages associated with one or more other labels. This type of message processing and interface may facilitate detection of performance issue and facilitate improved performance.

More specifically, each log message is parsed according to a signature that applies to the log message. A signature includes a skeleton of fixed message portions and zero or more placeholders. Each placeholder corresponds to a variable component, such that—for each log message having the signature—a value for the variable component appears at the placeholder's location in messages matching the signature. For a given signature, each message having the signature includes the same skeleton (e.g., same values for non-variable components identified in the skeleton), while messages having the signature can include different values for the variable component(s) with respect to other message having the same signature. Each of one, more or all variable components can correspond to and/or be a field.

The parsing can include extracting a value for each of one, more or all variable components from the log message (e.g., by identifying characters in the message that correspond to one, more or all placeholder(s)). In some instances, the parsing includes performing a string operation (e.g., to identify a part of a URL and/or to combine values from multiple variable components of a signature). Each of one, more or all extracted variable-component values can be associated with a field using the signature (e.g., or skeleton included therein) and/or relative or absolute position(s) associated with the corresponding placeholder. Each field may be associated with a name, which may be determined based on (for example) user input, a part of a skeleton (e.g., preceding the value), etc.

For each of a set of log messages, a value for each of one or more variable components may be used to identify a value for a virtual field to associate with the log message. The virtual field can be configured such that a value for the virtual field is generated based on data in a log message (e.g., one or more variable-component values) but that is not included in the original log message. A function can be defined that transforms a value for each of one or more variable components into a value for the virtual field (also referred to herein as a "label value"). The function may include one or more conditions configured to be evaluated using one or more values of variable components from an individual log message. The function may further identify, for each condition of the one or more conditions, a value for the virtual field to be assigned upon detecting that the condition is satisfied with respect to an individual log message.

For example, a function may indicate that a "fast" label value is to be assigned to a log message upon detecting that a value of the log message for a processing-speed component exceeds a defined threshold. As another example, a function may indicate that a "strong performance" label value is to be assigned to a log message upon detecting that a first value of the log message for a processing-speed component exceeds a defined first threshold and that a second value of the log message for a memory-usage component is below a defined second threshold. In some instances, a function can be defined to cover a universe of potential values for one or more variable components. For example, a first condition of the function may include an upper threshold and an (implied or explicit) open bottom, a second condition of the function may include a lower threshold and an (implied or explicit) open top, and—when the upper threshold is not the same as the lower threshold—one or more third conditions of the function may encapsulate the values between the upper threshold and lower threshold. Thus, a complete range of values for one or more variable components may be divided, via one or more conditions, into a plurality of sub-ranges—each being associated with a label value.

In some instances, the function is at least in part (or in its entirety) automatically generated. For example, for a particular variable component, a range and/or distribution can be identified based on values for the variable component in a current or previous data set. One or more conditions can be automatically defined that identify, for each portion of a plurality of portions of the range and/or distribution, a label value to be associated with the portion. The plurality of portions may be defined such that, for example, an integral of each portion distribution is substantially the same across portions or a sub-range of the range that corresponds to values in the portion is substantially the same across portions. A number of portions to be included in the plurality of the portions may be pre-defined to be (for example) a fixed, administrator-defined number or to be equal to a number of portions associated with one or more other conditions (e.g., at least partly defined by a user or implicitly or explicitly approved by a user).

The virtual field values can include (for example) descriptive label values (e.g., low, medium or high) and/or interpretative label values (e.g., poor, medium or good performance). In some instances, domain information for a domain of a source the log messages can be used to identify a condition-defining technique, number of portions and/or label values. The domain information can include (for example) information received from the source, information received from a user associated with the source and/or information learned based on past log messages received from the source and/or user input received at a label-defining interface that at least part specifies a processing to be performed on data from the source.

A label-defining interface can be generated that represents the function. The label-defining interface may be configured to accept user input that adjusts one or more thresholds, one or more interaction terms relating values of multiple variable components, one or more label values, a number of portions, and/or a presentation characteristic indicating how each label is to be presented.

Upon defining the function, a label value can be defined for each log message in a set of log messages. The label value can then be processed as a variable-component value, such that (for example) log messages can be sorted or filtered based on the label values, a plot can represent label values, text characteristics (e.g., color, font or size) can be selected based on the label values and applied to part or all of the log messages, and/or one or more other functions can be defined to process individual log messages' label values to generate other label values for the messages.

BRIEF DESCRIPTION OF THE DRAWINGS

Illustrative embodiments of the present invention are described in detail below with reference to the following drawing figures:

FIG. 4 shows an interface that is configured to receive input to define a set of log messages and to defining the grouping identifier.

FIG. 8 shows an illustrative interface that represents a definition for a categorical field based on numerical values in a particular log-message group field.

DESCRIPTION

Figure 1A:
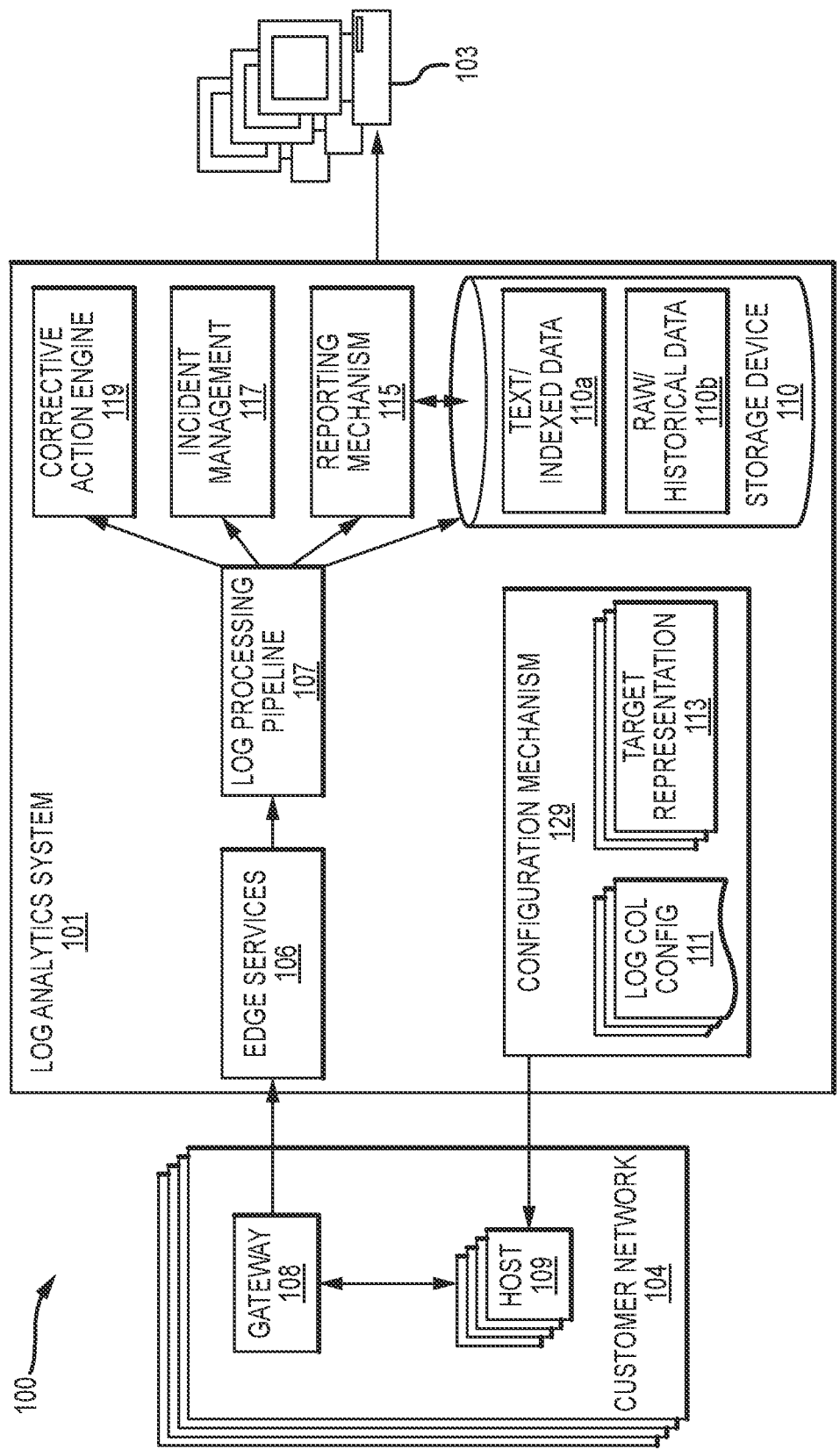
FIG. 1A illustrates an example system for configuring, collecting, and analyzing log data according to some embodiments of the invention.

Some embodiments of the invention provide an approach to automatically construct a log categorizer. Instead of requiring a person to manually assess the contents of the log parser, the log contents themselves are used to construct the categorizer. Other additional objects, features, and advantages of the invention are described in the detailed description, figures, and claims.

In some instances, a function is automatically generated and is configured to generate, for each log message of a set of log messages, a label value (also referred to as a value for a virtual field) based on one or more values associated with, respectively, one or more variable components in the log message. The function may be configured to divide a space of potential values for one or more variable components into a plurality of subspaces. The function can associate each subspace with a label value. The label value can thereafter be used to perform various data-presentation, data-sorting, filtering, statistic-generation, plotting and/or virtual-field-generation operations.

The functions can depend on one or more values associated with, respectively, one or more variable-component values. In some instances, variable-component values are extracted using one or more signatures. For example, a set of log messages may be received (e.g., from one or more web servers, database servers, etc.). Each log message can be formatted in accordance with a signature and include one or more field values. The set of log messages may include messages formatted in accordance with multiple signatures, may be generated using different cookie data, and/or may include field values (e.g., parameters) for different fields. A signature includes a skeleton of fixed message portions and zero or more placeholders. A signature can have some similarities to a schema—as either can identify types of data represented in one or more corresponding messages and/or positional data associated with the information. However, signatures may differ from schemas in a variety of ways. For example, signatures can be discovered from raw data, while schemas are typically discovered from marked-up data. As another example, a single data type occurring in multiple placeholders can cause different signatures to be created even though these different signatures may conform to the same data type definitions (or schema). This may be due to a base assumption that incoming data is to conform with at least one schema. As yet another related example, a signature is not applied to a log message—if the message doesn't match an existing signature, then a new signature is created for the message; the detected signatures may then be clustered. Meanwhile, schema environments may essentially force a selection from amongst existing schema options and/or ignore a message if an acceptable schema correspondence is not identified. As still another example, a signature is not merely metadata about messages but includes fixed content of messages that match the signature, while schemas need not include any fixed content at all. Some schemas may further be specified without any positional or ordering constraints (while such data is identified in skeletons of signatures). This input flexibility of schemas may result in varying number of field values being detected for a given schema and identified with a single message, while a number of field values detected in the signature context is constant across messages for a given signature.

In some instances, a function can identify, for each of one or more variable components, one or more ranges (e.g., open- or closed-end range) of potential values. Each range (or combination of ranges) can be associated with a label value. For example, a function may identify three ranges of a variable-field component (e.g., identifying a geographic location, host, system, etc.), each of which is associated with a label value. As another example, a function may identify three ranges of a first variable component and two ranges of a second variable component, and each of the resulting six combinations of ranges can be associated with one of six label values. As yet another example, a function may identify three ranges of a first variable component and two ranges of a second variable component, and each of the resulting six combinations of ranges can be associated with one of four label values (e.g., as two combinations of first-variable-component values and second-variable-component values may be associated with a same label value).

The range(s) (or other function definitions) may be automatically defined based on, for example, a distribution or range of values from the previously received log messages (which may, but need not, include log messages yet to be processed for a present operation). For example, the range or distribution (e.g., based on data-set percentage) may be divided into a predefined number of divisions, each of which corresponds to a range of variable-component values.

As one illustration, a set of log messages may be received from one or more sources. One or more signatures may be used to extract each variable-component value for each message. Each variable component may be thereafter identified as a field. A name of the field may correspond to a name identified in a non-variable component associated with the variable component, a name identified based on domain information (e.g., received from a data-source device), etc. An interface may present the name of the field and optionally data based on at least some of the variable-component values from the set of log messages (e.g., identifying, for each of at least some of the set of log messages, the variable-component value(s) from the message). The interface can include an option configured to accept input that corresponds to a request to segment variable-component values for the field.

Upon detecting selection of the option, a function can be automatically generated for the field that transforms variable-component values into label values. In some instances, the function identifies—for each label value—a range of values for the field, such that the label value is to be assigned upon detecting that a log message includes a variable-component value for the field that is within the range. The ranges can be identified by, for example, dividing a space of potential values for the field in accordance with a segmentation technique, such as one that (for example) prioritizes equally segmenting the space in accordance with values or occurrences or one that segments the space to differentially label outlier values. The label values can include, for example, relative terms of adjectives, such as "high", "medium" and "low" or "poor", "normal" and "good". Performance-characterizing labels may be generated based on information or estimates as to whether a high value represents strong performance (e.g., such as a field corresponding to a speed) or poor performance (e.g., such as a field corresponding to memory usage or latency). Each label value may further be automatically associated with a presentation characteristic, such as a color, size, font or style of text.

Effecting the function may thus trigger generation of a new virtual field, and a label value for the virtual field can be generated for each log message in the set of log messages. In some instances, field data for each of one or more log messages of the set of log messages is presented, where the field data includes the label value and may further include one or more variable-component values associated with, respectively, one or more variable-component fields. At least part of the field data and/or a message identifier may be presented in accordance with the presentation characteristic associated with the label value generated for the message. For example, a color of the label value may be set in accordance with the presentation characteristic. The presentation can be configured to, for example, accept and process requests to sort and/or filter the set of log messages based on the virtual field.

Before or after the function is effected, an interface may be presented that is indicative of the automatically generated segmenting, label values and/or presentation characteristic. For example, an interface may indicate that a "high" label is to be assigned if a value of a field is above 5.0 and that a "low" label is to be assigned otherwise. The interface can be configured to accept and implement user modification of the segmenting, label values and/or presentation characteristics. For example, the interface may identify one or more thresholds that separate corresponding adjacent ranges and may be configured to allow a user to modify each of the one or more thresholds. As another example, the interface may be configured to receive input corresponding to a request to add an additional range (and corresponding label value) or to remove a range (and corresponding label value). The interface may, but need not, show a total range, distribution or other statistic of variable-component values for the field.

Upon receiving a modification of the segmenting, the function can be effected to identify, for each log message in the set of log messages, a label value for the virtual field, as described herein.

Initially defining the function automatically can save time for defining virtual fields. Segmenting techniques may be (for example) predefined, defined at least in part based on information corresponding to a domain of a source of log messages and/or learned using a machine learning technique. For example, domain information may identify one or more range-separating ranges, a set of label values, a number of ranges to be defined, and/or directionality of a field (e.g., indicating whether higher numbers are indicative of better or worse performance). As another example, a machine learning algorithm may be used to identify a directionality of a field-value axis (e.g., whether higher numbers represent better or worse performance). The learning may be based on (for example) past user modifications (or lack thereof) of performance-indicative value labels associated with ranges corresponding to a same or similar field and/or correlation of the field values with values of one or more other fields indicative of performance. In some instances, a machine learning algorithm is used to learn domain information to be used to at least partly define a function to process log messages from the domain. Learned data may be (for example) stored as metadata associated with a given domain, time period, virtual field, underlying variable-component field and/or user.

In some instances, the function is defined to use a segmenting technique that depends on a seasonal profile that applies to a data. To illustrate, a high system load may be normal during work hours and/or in response to detecting receipt of many data requests but may be abnormal during the nights and weekends and/or in response to detecting few data requests. Thus, a range that is to correspond to a "poor performance" label value may change depending on the time of the day and day of the week. One approach is to generate a seasonal profile that is indicative of a seasonal period over which field values vary (e.g., a weekly seasonal period). Within the period, various time intervals associated with trends of one or more field values may be detected. The time intervals may be sparse, dense, both or neither. For example, memory-usage field values may be associated with a spike (representing higher memory usage) on Wednesday, though a magnitude of the spike may vary across time periods; this pattern may be a sparse pattern given the spike nature but not a dense pattern given the varying magnitude. Seasonal data may include a general dense part of the profile that represents typical. The profile can be used to process, for each log message of a set of log messages, one or more field values in accordance with typical performance patterns associated with a timestamp of the log message.

For example, a classification technique (such as a technique disclosed in U.S. application Ser. No. 15/057,062, filed on Feb. 29, 2016, which is hereby incorporated by reference in its entirety for all purposes) may be used to detect a dependency and/or pattern of a field. A clustering technique (e.g., that detects a pattern from time series data modified based on sparse noise features and dense data features) may output expected distribution properties and/or one or more range-separating thresholds based on one or more applicable conditions (e.g., time of day, day of week, request characterization data, etc.). As another example, a classifying technique (e.g., that iteratively assigns instances or log messages to a seasonal pattern, such as a technique disclosed in U.S. application Ser. No. 15/057,065, filed on Feb. 29, 2016, which is hereby incorporated by reference in its entirety for all purposes) may be used to identify messages and/or times that correspond to a particular seasonal pattern, which may be associated with particular field-value distributions, range definitions, label values, etc.

It will be appreciated that, while disclosures herein may refer to a function and/or processing that depends on or is associated with "a" field or "a" variable component, the function and/or processing may—in other instances—depend on multiple fields or multiple variable components. For example, a function may indicate that a "fast" label value is to be assigned when a processing-speed field value is above a predefined threshold and a request-processing field value is set to "yes". In some instances, an automatically generated initial function may depend on a single field, and an interface can be configured to allow a user to identify an additional dependency on one or more other fields. For example, an initial function may indicate that a "good performance" label value is to be assigned when a data-retrieval field value is below a first threshold. An interface may be configured to allow a user to select an additional field of "file size" and indicate that "good performance" label value is to be assigned when the data-retrieval field value is below the first threshold and a file-size field value is below a second threshold.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records", "machine-generated data records", "log messages" or "messages", without intent to limit the scope of the invention to any particular format for the data. A machine-generated data record may include or may be (for example) a log message, an electronic file (e.g., a document, spreadsheet, or image file) and/or a communication (e.g., a post onto a website, SMS message, or email).

A machine-generated data record may include machine-generated data, such as data generated by a server, security device, access control device, or computer. In some instances, a machine-generated data record is generated by a machine automatically (e.g., in response to an event, such as receipt of a communication, detecting a defined time or completion of a defined time interval, detecting satisfaction of a condition such as one that relates to data storage, sensor reading, and/or operation of a computer system). In some instances, a machine-generated data record is generated without relying on recent human input (e.g., local human input) to define what data is to be included and/or to trigger generation of and/or transmission of the machine-generated data record. A machine-generated data record may be represented in a log message in a machine-readable manner. A machine-generated data record may, or may now, be human-readable. A machine-generated data record be structured, semi-structured or unstructured. In some examples, data in a machine-generated data record may include XML or JSON data.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
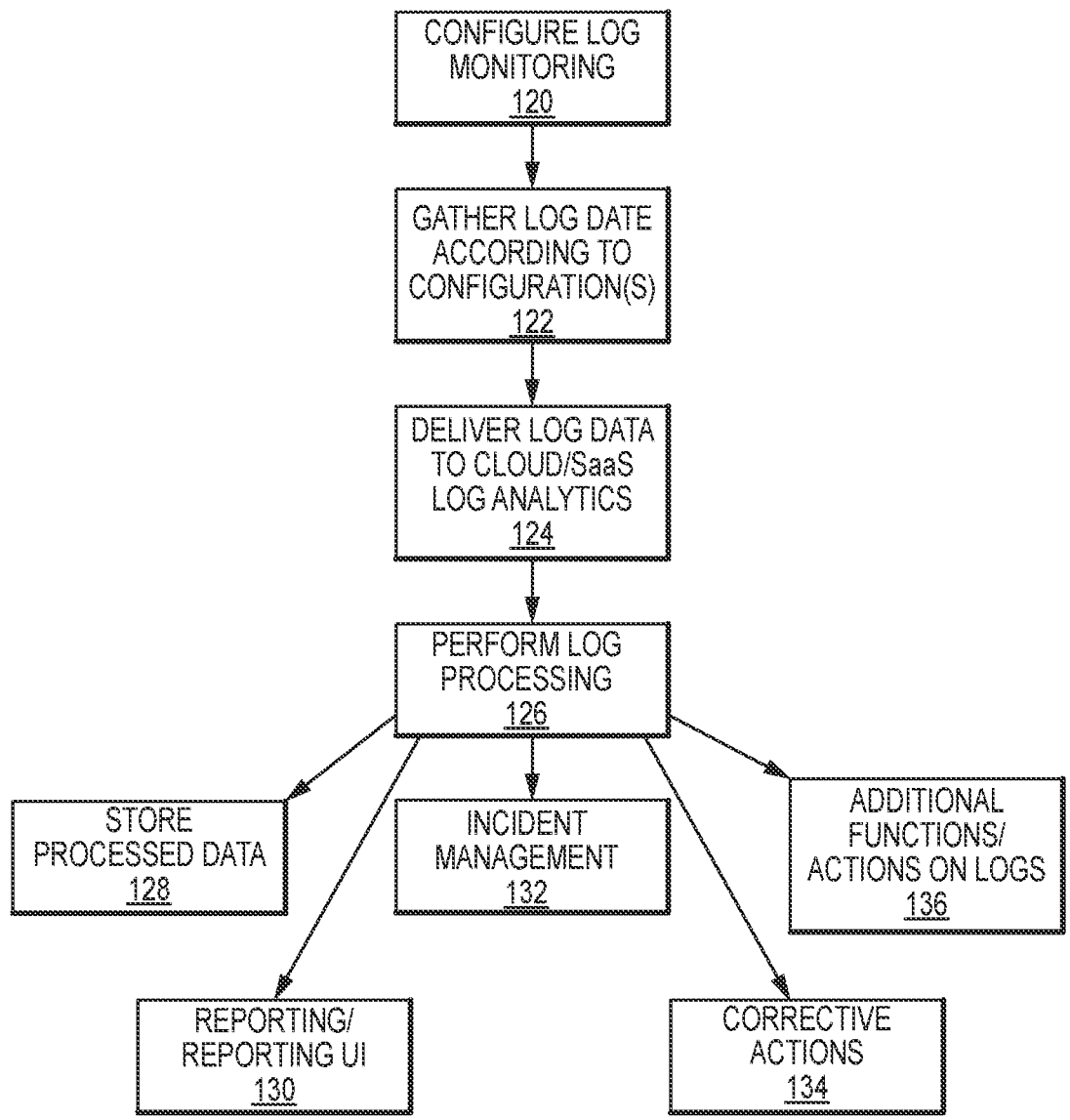
FIG. 1B shows a flowchart of a process for configuring, collecting, and analyzing log data according to some embodiments.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration Ill may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. At 128, the processed data is then stored into a data storage device 110. In various instances, a log message may, or may not, be stored in its entirety. For example, rather than storing a log message in its entirety, stored data may instead identify a value for each of one or more variable components and an identifier of a skeleton. This data may then be used to reconstruct a message if subsequently needed or requested. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source enterprise search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
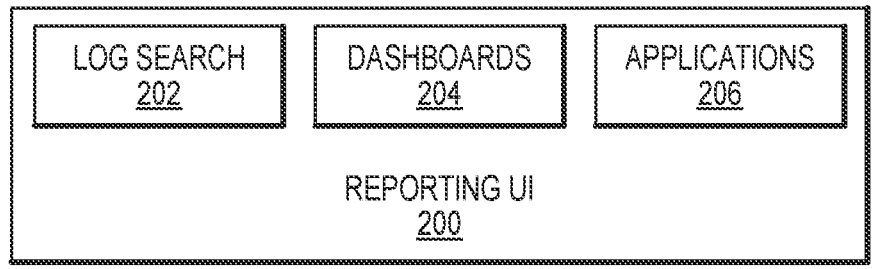
FIG. 2 shows an example reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below. In some instances, reporting is performed in response to a query. Reporting may therefore, in some instances, occur with some delay with respect to the log processing performed at 126 and/or storage performed at 128. Further, processing of a query to generate a report may include further log processing and storage. A report may be provided, for example, via a web interface, application interface, email transmission or file download.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
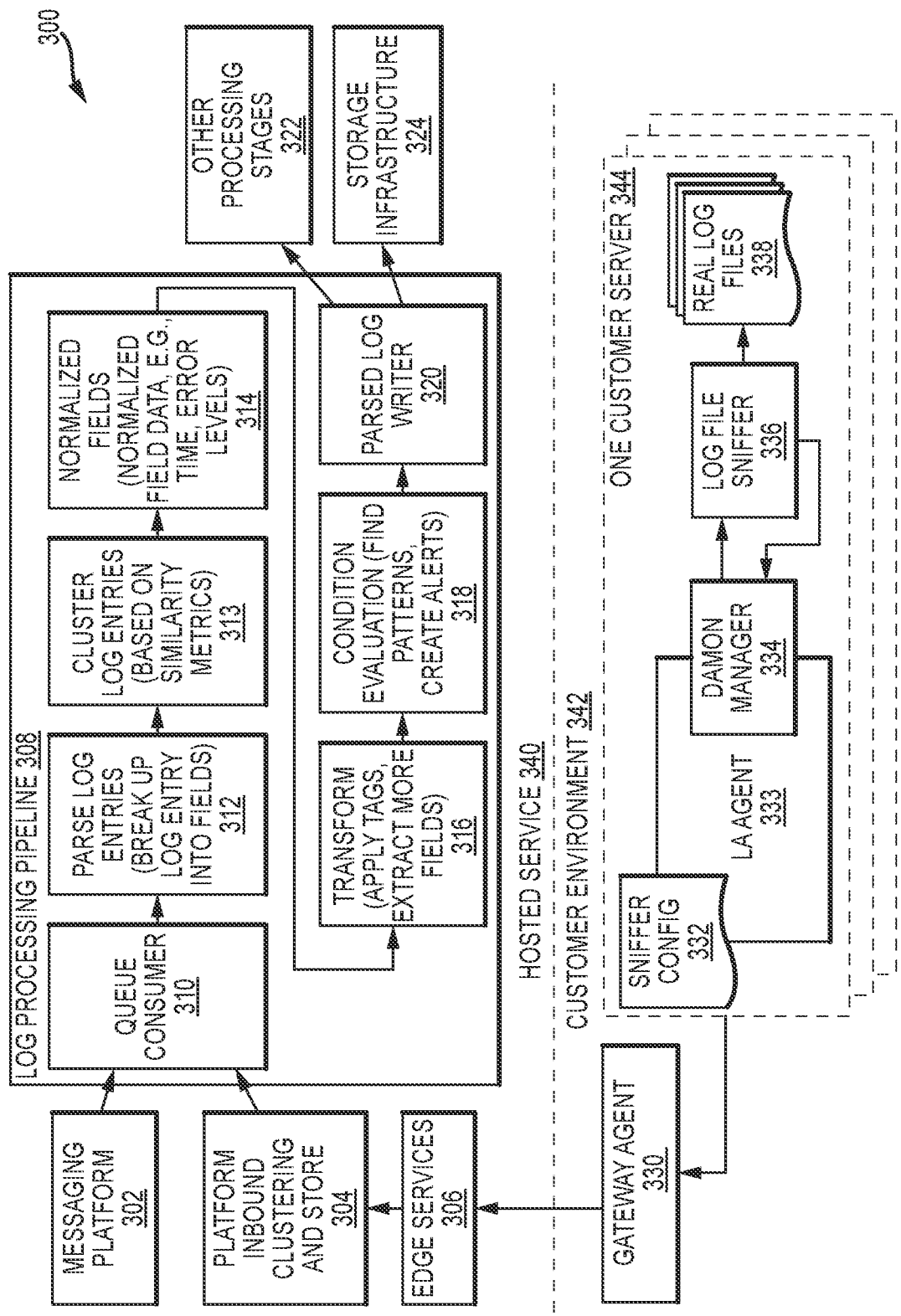
FIGS. 3A-3C provide illustrations of the components and actions associated with a host environment and customer environment for processing log data according to some embodiments.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). For example, SOLR can be used to index log messages to identify initial cluster assignments. In some instances, an initial or preliminary processing may be performed at an ingest time, which can include a time corresponding to (e.g., before, shortly or immediately after, or concurrent with) storage of the data and/or a time corresponding to receipt of the data. The initial or preliminary processing may include (for example) parsing each log message into multiple components. The parsing may be performed using one or more parsing grammar rules. For example, a parsing grammar rule may assess a log message to detect particular punctuation, capitalization, character types (or changes in character type), and so on, which may correspond to a separation between components, a beginning of a component, or an end of a component.

As a result of the parsing, a value for each of the multiple components can be extracted from the log message. It can then be determined, for each value, whether the value corresponds to a non-variable component or a variable component. A non-variable component may include (for example) a field tag. In some instances—but not others—a field value may also be identified as a non-variable component. For example, part of a log message may include: "Power: ON", such that "ON" is a value for a power field. While the value may vary across records, a limited number of potential values (e.g., "ON" and "OFF") and/or grammar rules (e.g., that may identify character strings to be non-variable components) may identify the value as being non-variable.

An initial cluster may be determined based on the value for each identified non-variable component. For example, a hashing technique may be applied to a combination of each value of each non-variable component to generate an identifier of the initial cluster. The log message may then be stored in association with the identifier of the initial cluster or other cluster data can be stored to indicate that the log message is associated with the initial cluster. In some instances, a cluster assignment may be updated (e.g., at ingest or later) based on one or more rules, such as a merging rule. Cluster assignments may—but need not—be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

In some instances, the retrieved log data undergoes a parse stage 312, where the log entries are parsed and broken up into specific fields or components. The parsing can be performed in accordance with one or more grammar rules. The "log type" configured for the log specifies how to break up the log entry into the desired fields. In some instances, pipeline 308 does not include parse stage 312. Instead, subsequent processing may be performed on previous parsing, component detection, component characterization (e.g., as being variable or non-variable), preliminary cluster identification, and/or selective value storage from initial clustering and storage 304.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case unabbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a request from a user device to access or view log data.

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
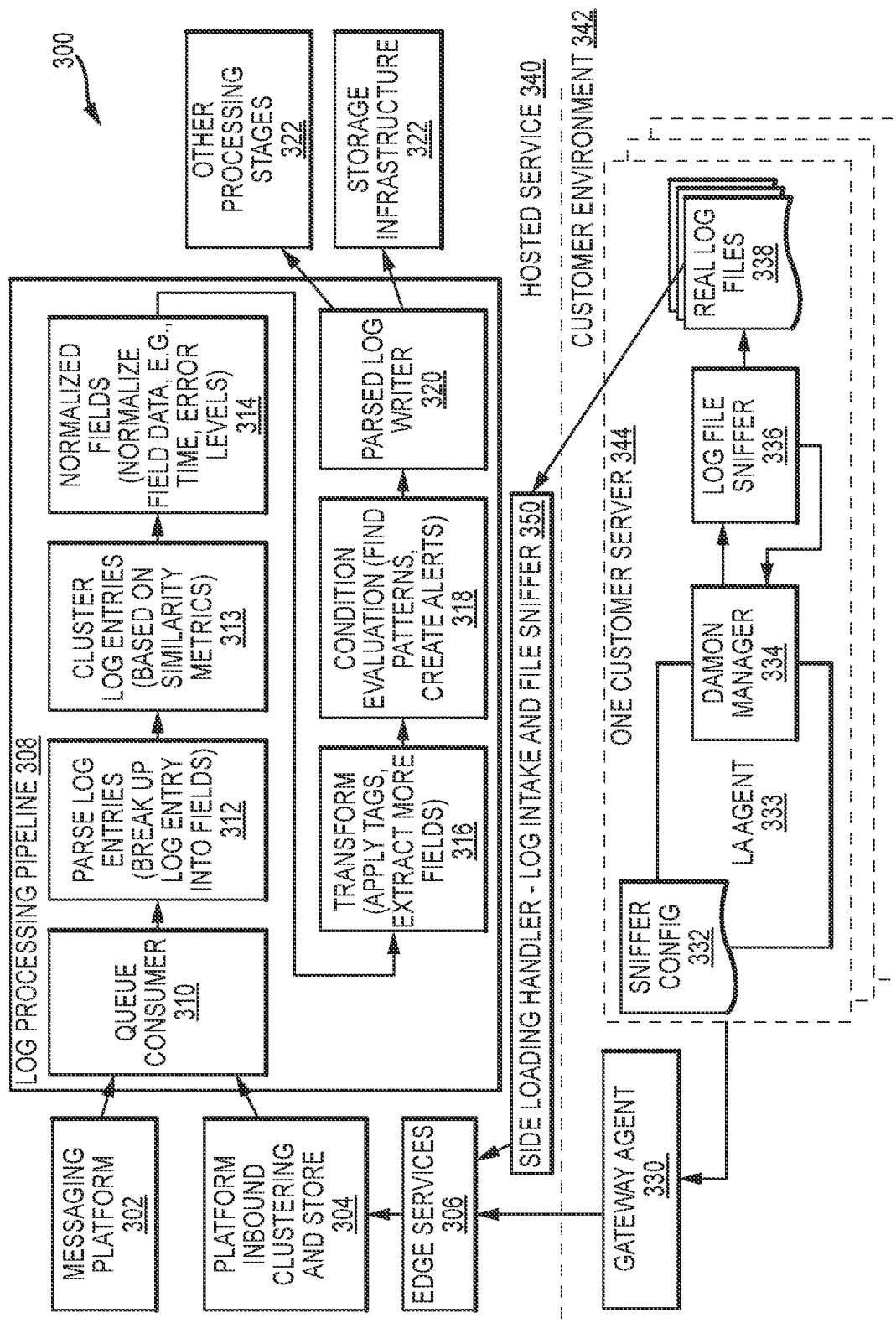
Figure 3C:
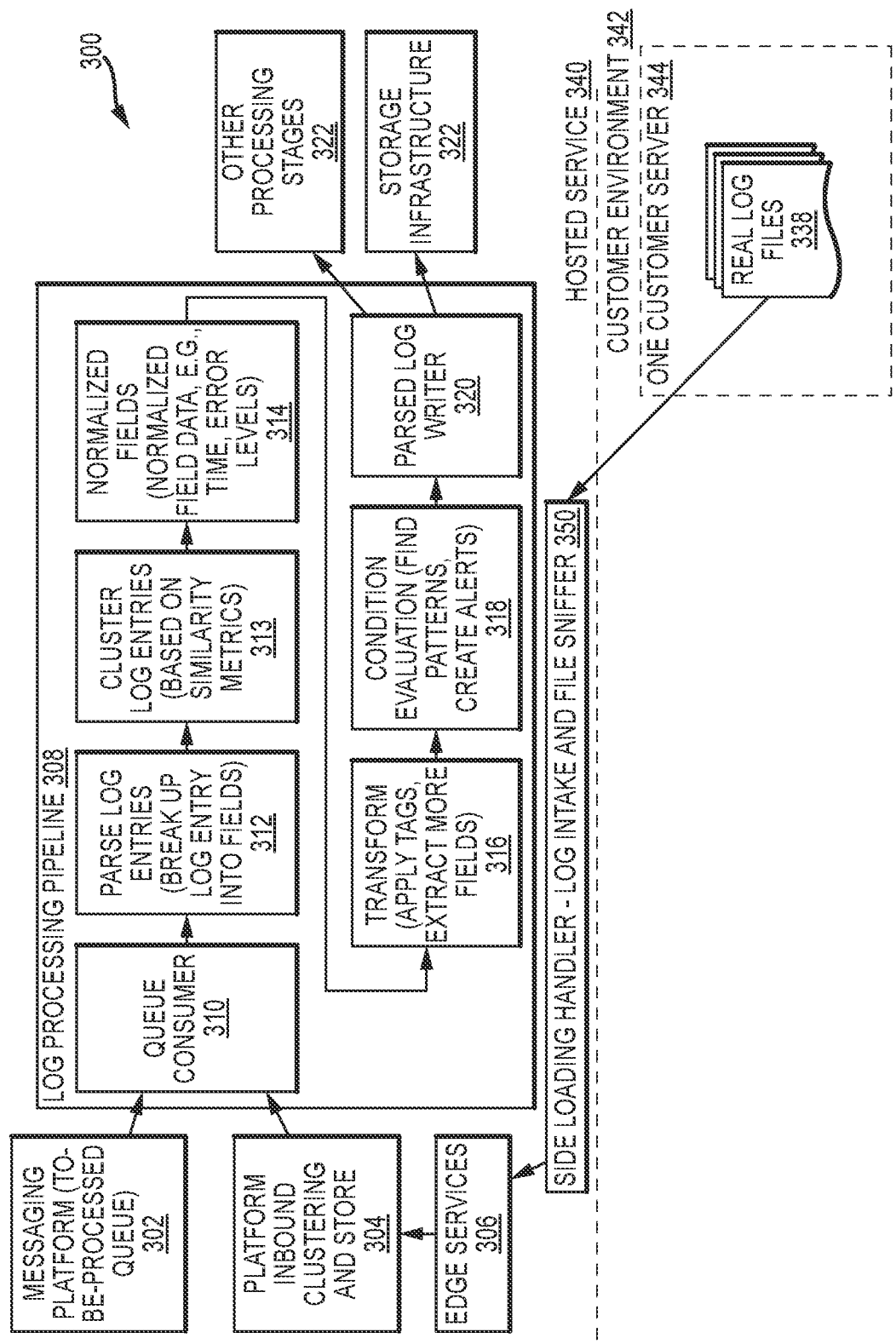

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

Authorized devices may access log messages to (for example) generate one or more statistics, evaluate one or more rules, and/or present all or part of select log messages. Presenting log-message data can be informative with regard to, for example, performance and/or usage of a system. However, the high volume of messages can complicate data-presentation efforts and/or attempts to interpret the data. Thus, generating more compact representations of a set of log messages can be useful.

Figure 4:
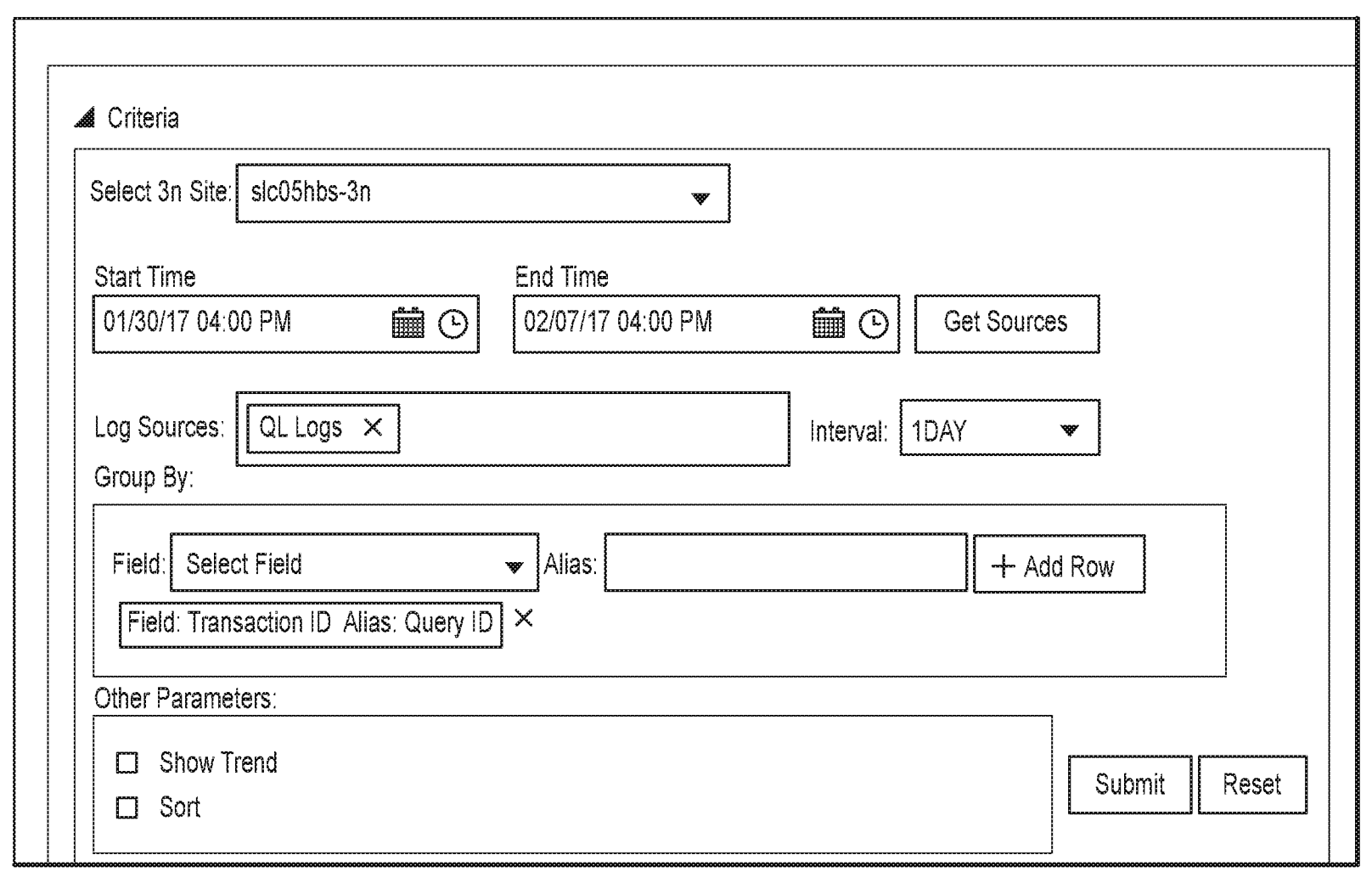

One approach for generating compact log-message representations is to assign each of at least some of a set of log messages to a group and to generate and present statistics for each group. A particular grouping identifier may be identified, which can include (for example) an identifier of one or more fields, such that each log message assigned to a given group is to have, with respect to each of the one or more fields, a same value for the field relative to one or more other log messages in the group. For example, a grouping identifier may include a field corresponding to an identifier of a transaction, user, user device, cookie, host, system or location. The grouping identifier may be identified based on user input. For example, FIG. 4 shows an interface that is configured to receive input to define a set of log messages and to defining the grouping identifier. In this particular example, input received at the interface indicates that the set of log messages is to include QL Log messages from site abcdefg05 with time stamps between 4:00 pm on Jan. 30, 2017 and 4:00 pm on Feb. 7, 2017. Input further indicates that the messages are to be grouped based on values of the Transaction ID field, and that these values are to be represented as a "Query ID" values. It will be appreciated that, in some instances, a grouping identifier may be identified automatically without being based upon user input. For example, a clustering technique may be used to identify one or more fields via which respective grouping would generate a number of groups within a predefined range.

Upon identifying the grouping identifier, each log message in the set of log messages can be assigned to a group based on the value(s) for the field(s) identified in the grouping identifier. If one or more log messages in the set of log messages lack a value for the field(s), they may be omitted from the bucket assignment or assigned to a bucket representing the lack of the field value(s). More specifically, a set of buckets can be defined, each being associated with a unique grouping field. Each log message assigned to a given bucket can include a same field value for the grouping field (e.g., a same transaction identifier).

Figure 5A:
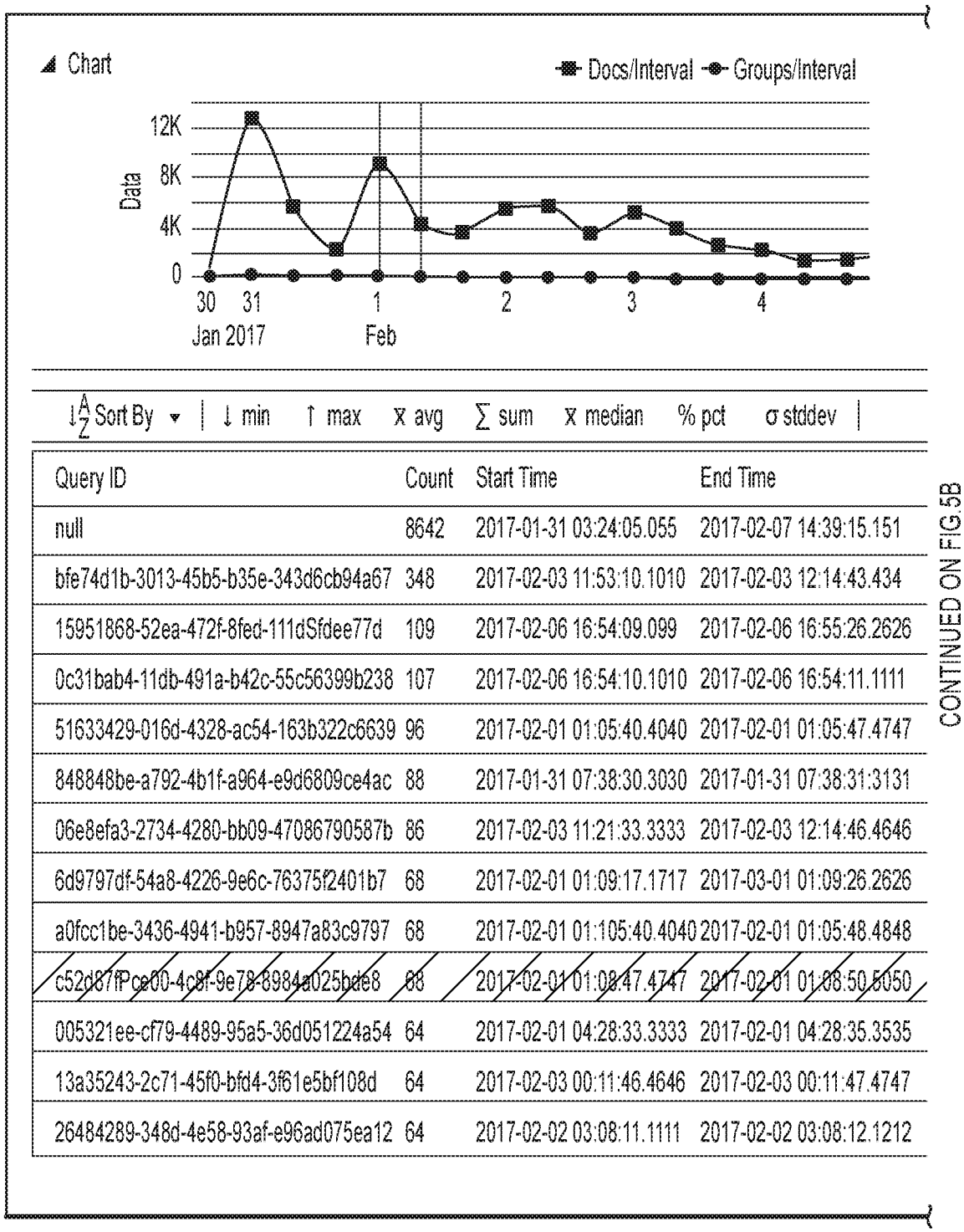
FIGS. 5A-5B shows an example of an interface that includes statistics for each of a set of log-message buckets.
Figure 5B:
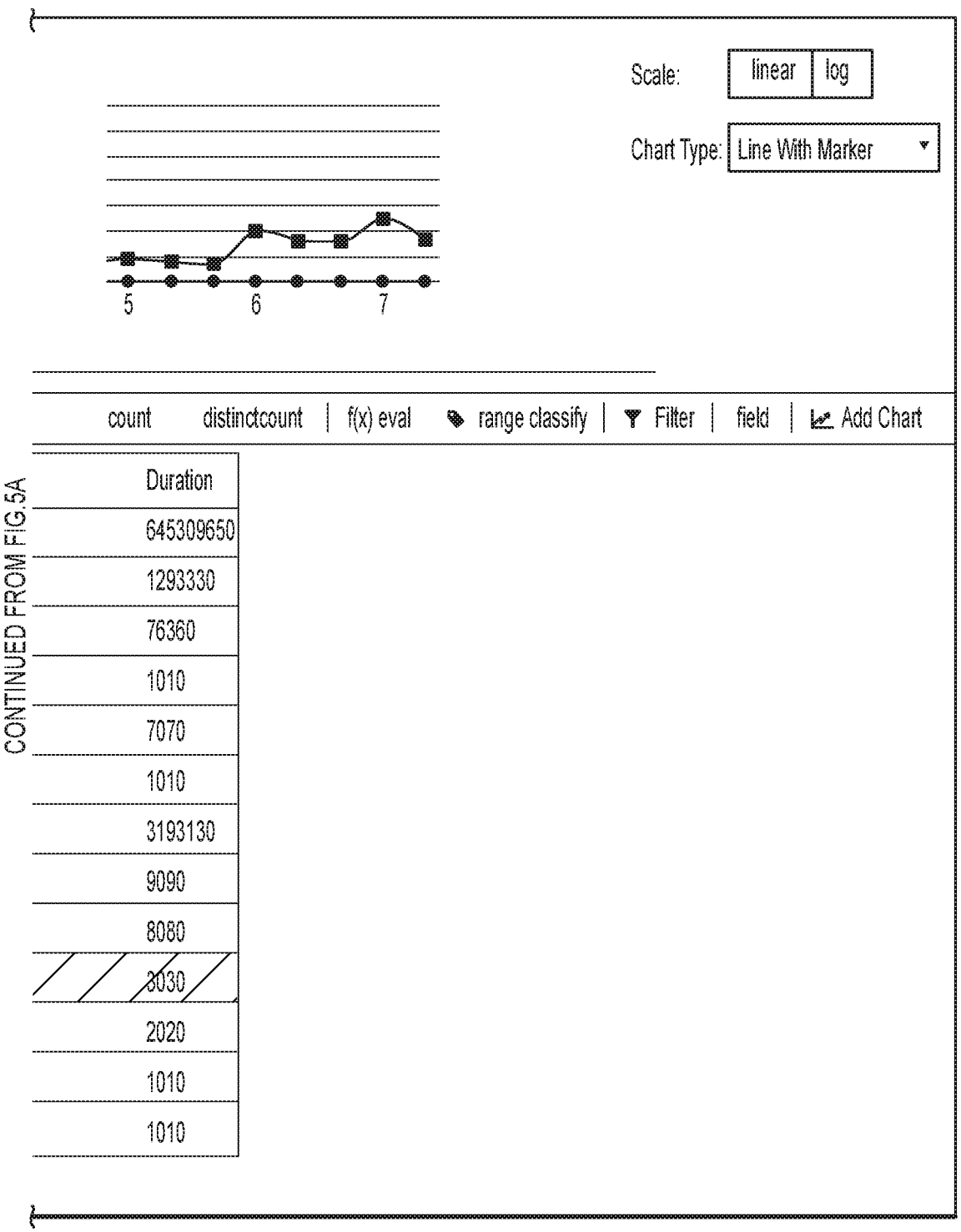

One or more statistics can be generated for each bucket. For example, for each bucket, a minimum and/or maximum for one or more fields can be identified, such as a timestamp field. As another example, an average, median or mode statistic can be generated for one or more fields, such as a processing-time or response-latency field. As yet another example, a count of messages assigned to the bucket can be identified. As still another example, a time series for the bucket can be generated that indicates, for each of a set of consecutive time bins, a number log messages that are both assigned to the group and correspond to a timestamp within the time bin. It will be appreciated that, a statistic may be stored as a value of a field for a log-message group. Thus, for example, for each group of one or more log-message groups, a count value may be stored in association with a count field that indicates a number of messages assigned to the group. FIGS. 5A-5B shows an example of an interface that includes statistics for each of a set of buckets—the buckets having been generated using the grouping identifier as defined in the interface shown in FIG. 4.

Figure 6A:
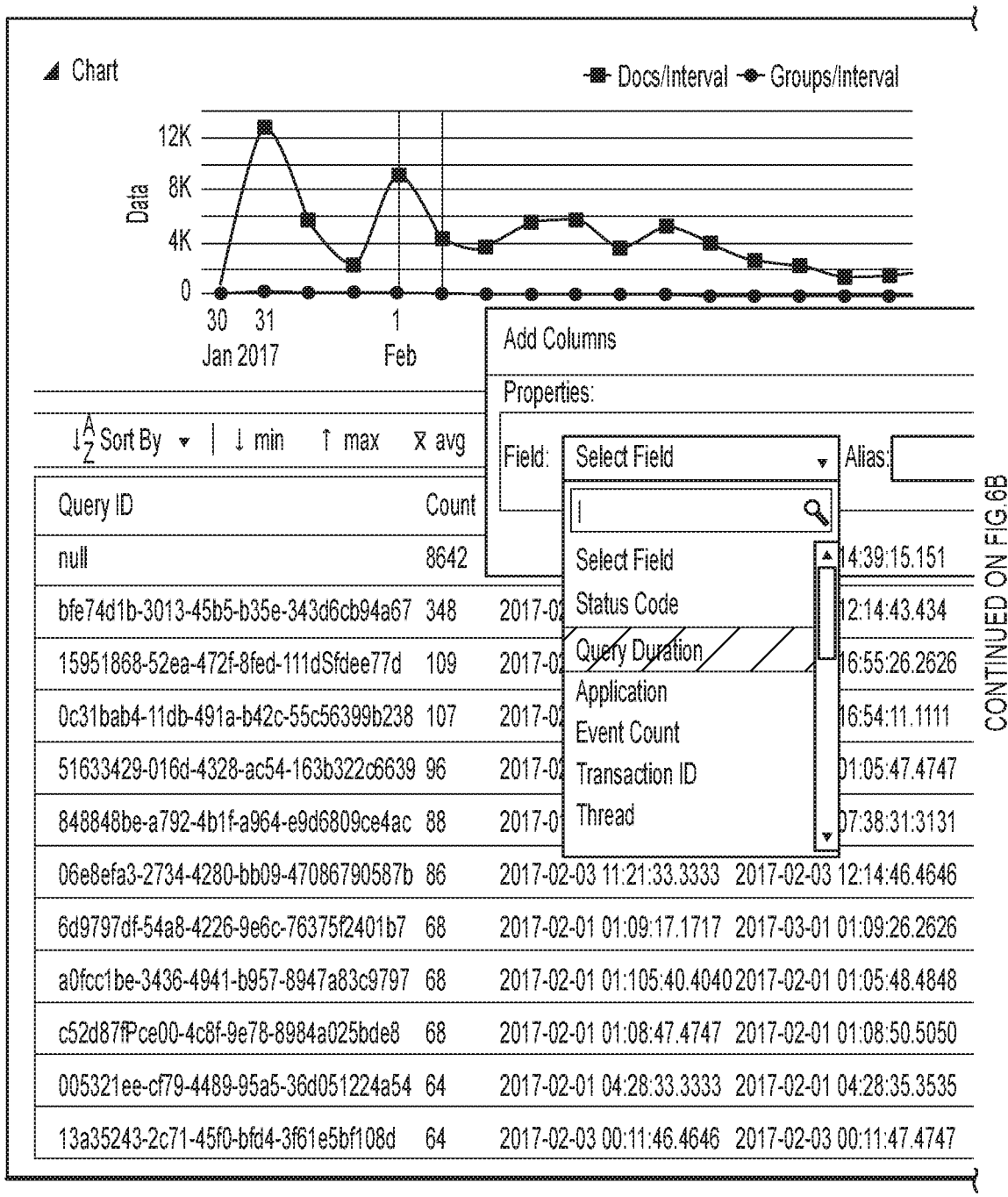
FIGS. 6A-6B shows an example of a display of a user interface configured to accept input to define a new statistic column.
Figure 6B:
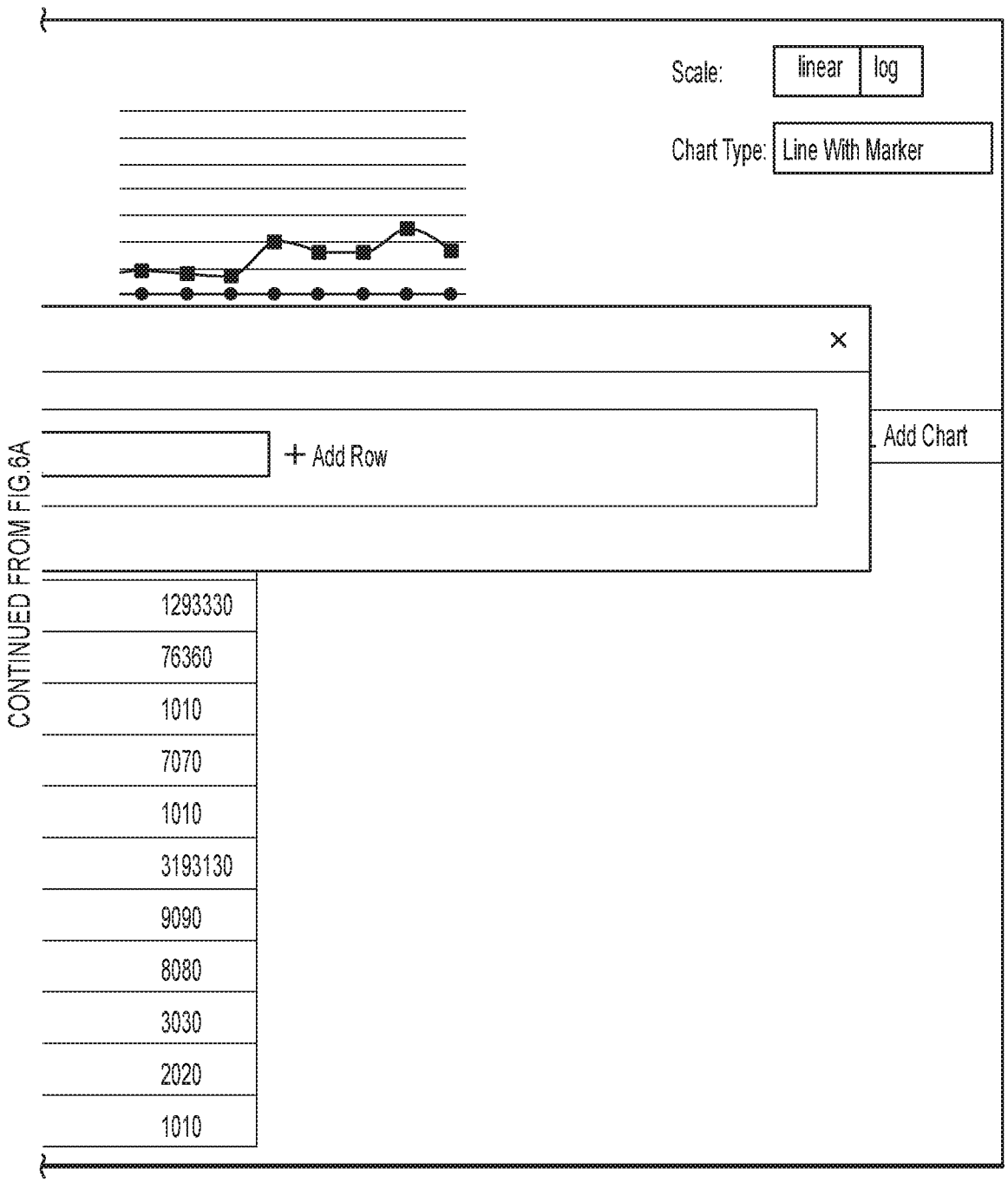

The interface may further display statistics that may be defined (for example) based on a predefined rule and/or user input. FIGS. 6A-6B shows an example of a display of a user interface configured to accept input to define a new statistic column. The interface may identify various fields available for statistical processing (e.g., identified based on one or more signatures applicable to some or all of the log messages). The interface may further be configured to receive input to identify a name for the statistic. In some instances, an initial name is suggested (e.g., based on a selected field name or name of a corresponding signature variable component).

In the depicted instance, the particular display is configured to generate only "sum" statistics, such that values of a particular field are to be summed across messages in a bucket. Selection of other statistical-type buttons may trigger corresponding interfaces to be presented to enable other types of statistics to be generated. In some instances, a single interface may receive selection of a field and statistic type (e.g., sum, different, maximum, minimum, etc.)

Figure 7:
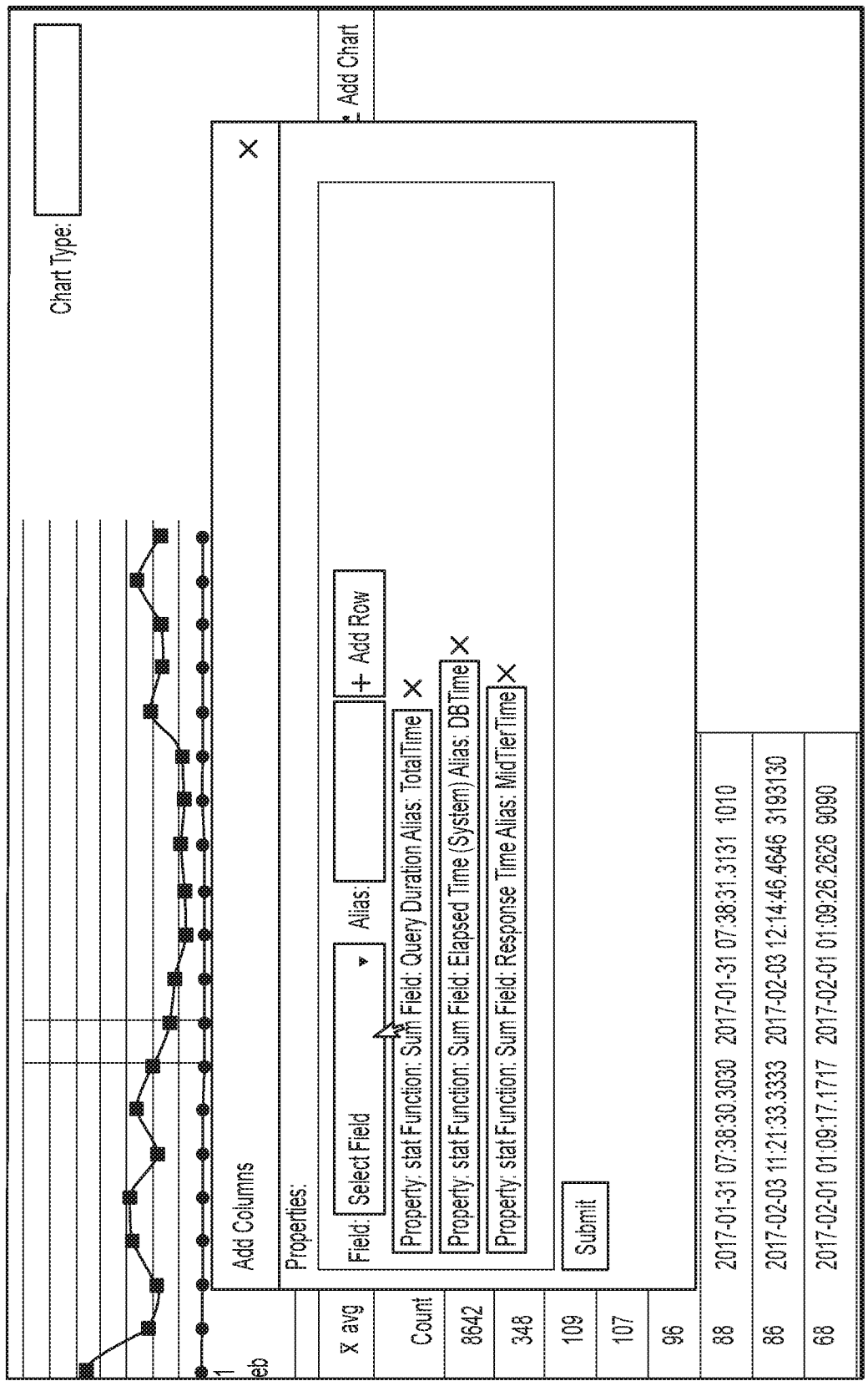
FIG. 7 shows an example of interface representing input corresponding to a request to define summing statistics.

FIG. 7 shows an example in which three summing statistics are defined. A first statistic is a sum of a total query duration across all log messages (e.g., a total time taken for transaction). A second statistic is a sum of a database-connection time (e.g., occurring when a database connection is established for a query). A third statistic is a sum of mid-tier times. Thus, one or both of the second and third statistics may contribute to any observed delay indicated in the first statistic. It will be appreciated that a single statistic may be generated based on values from multiple fields (e.g., a difference between a maximum end time and a minimum start time).

One approach for generating compact log-message representations is to reduce a size of a value space for one or more fields (e.g., of a log message or group of log messages). For example, a numeric field value (identified along an open or closed continuum) may be transformed to a categorical value. To illustrate, a latency value—which may, at least in theory, be any numeric value—may be transformed into one of three categorical "fast", "medium" or "slow" values. The categorical value need not (though it may) replace the numeric value but instead may be added as a new field that may be used to form a basis for presentation and/or calculation options. For example, a count may be generated for each category (e.g., to indicate how many "slow" events were detected) or the categorical value can be used to filter log messages (e.g., such that log messages associated with problematic field values can be selectively viewed).

A categorical field can be defined, in various instances, automatically or based on user input. A definition of a categorical field can include an indication as to how one or more values of one or more existing fields are to be processed to produce a value of the categorical field. The definition may include (for example) one or more logic statements, one or more if statements, one or more ranges, a step function, or a decision tree. For example, a number of categories can be predefined (e.g., generally or for a particular type of field). A set of thresholds can be defined. Each category can be defined so as to correspond to a range of numeric field values, and the ranges can be consecutive across the categories. The thresholds can indicate separation values between the ranges. The thresholds can be defined to (for example) approximately evenly divide an actual (current or past) or potential value space, approximately evenly divide a log-message set (e.g., to have a similar number of long messages in each range), and/or isolate outliers into distinct categories. The thresholds can be defined (for example) based on previous inputs defining or modifying thresholds, processing of a current or past data using a clustering algorithm, and/or a distribution of current or past field values.

In some instances, a definition for a categorical field is defined partly automatically. For example, upon detecting one or more initial request inputs (e.g., identifying a field upon which a new categorical field is to depend and/or a number of categories), an automated process may generate an initial definition for a categorical field (e.g., identifying a range of values to associate with each category). The definition can be represented via an interface, which can be configured to receive input from a user to modify the definition (e.g., to change one or more range-separating thresholds and/or modify a number of categories). Each category can be associated with a name. The name may be descriptive based on the underlying field values (e.g., low, medium or high) or interpretive based on known or estimated directionality of an underlying field (e.g., good, fair, or poor performance).

Figure 8:
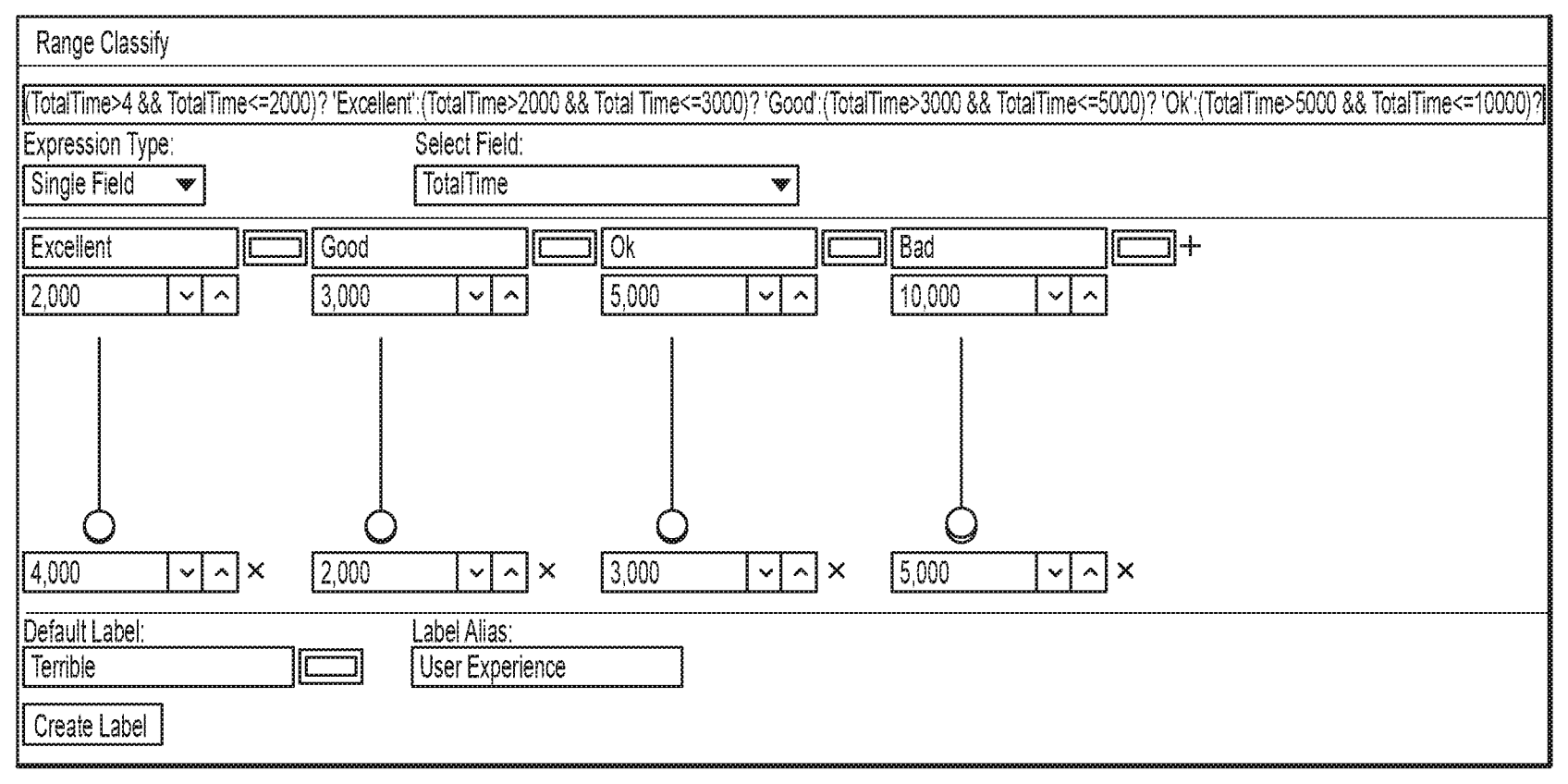

FIG. 8 shows an illustrative interface that represents a definition for a categorical field based on numerical values in a TotalTime field. The interface can be presented (and the definition can be generated) in response to detecting a request communication from a user device that corresponds to a request to generate a categorical field based on an existing TotalTime field. The definition includes four ranges, each associated with a corresponding category. The bottom category is unbounded at its lower end of the range, and the top category is unbounded at its upper end of the range. Three interim boundary values (i.e., thresholds) separate the ranges.

The interface can be configured to receive input that modifies a number of categories (e.g., by interacting with the "+" and/or "x" buttons or—in other instances—by specifying a number). Boundaries between ranges may be set by entering numbers or interacting with one or more sliders. For boundaries that are not a lowest or highest boundary, setting the boundary may cause a corresponding boundary to be automatically set. For example, defining a maximum of a first range may result in a minimum of a second range to be automatically set. The interface may further be configured to receive a new or modified name for each category and/or a presentation characteristic to associate with each category (e.g., a color). In some instances, the interface may further or alternatively be configured to receive a selection of an icon to associate with each range (e.g., such that an icon corresponding to a particular range is displayed in association with a bucket in a range-associated column/row).

Figure 9A:
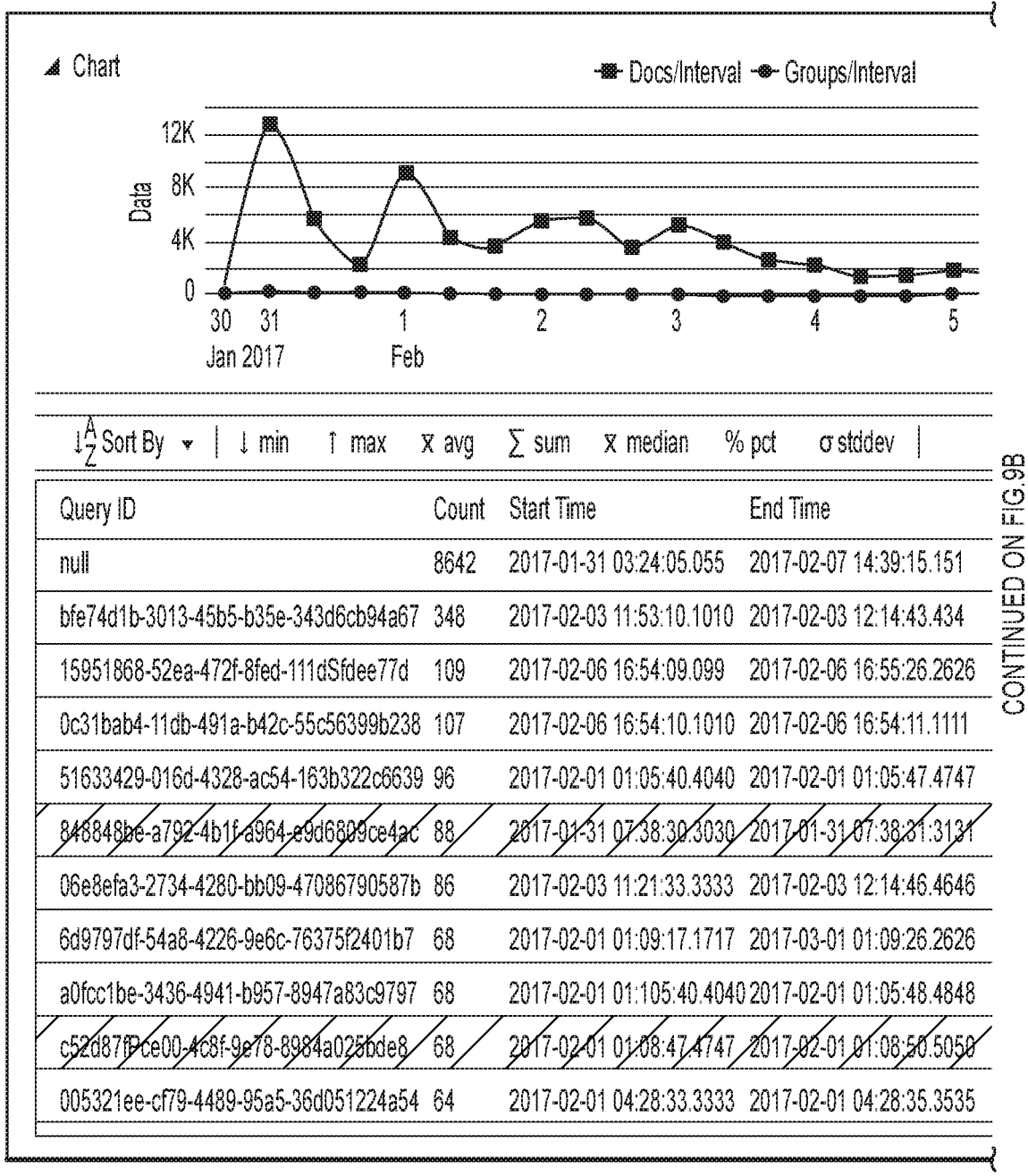
FIGS. 9A-9B shows a representation of each of a set of message groups, where each group representation further includes a value of a categorical field.
Figure 9B:
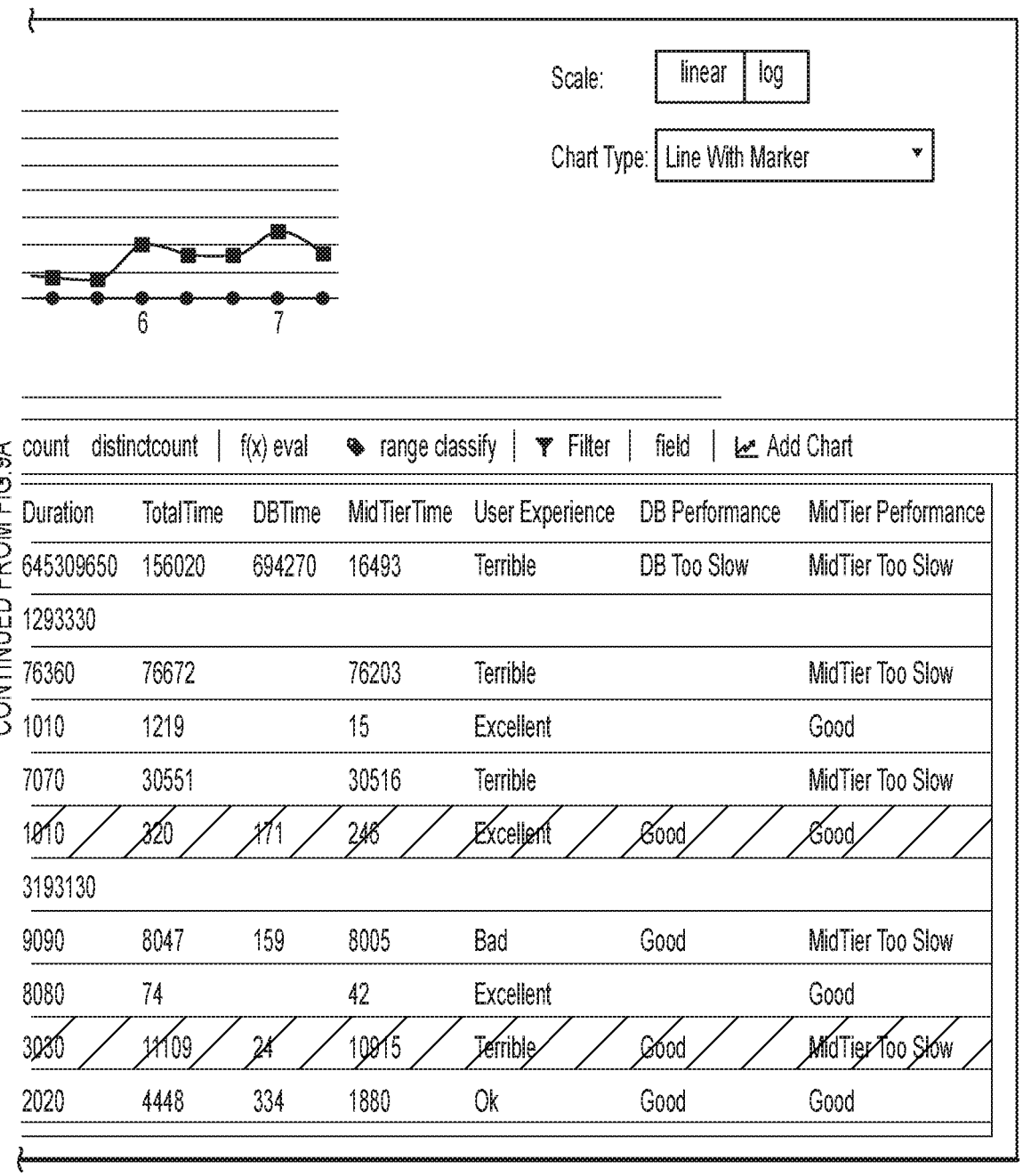

A categorical field (e.g., defined as a result of automated processing and/or user input) can function as a normal field with regard to, for example, presentation, processing and/or plotting functionalities. For example, for each of one, more of all groups of log messages or individual log messages, a value for the categorical field may be displayed in association with a representation of the group or log message. For example, FIGS. 9A-9B shows a representation of each of a set of message groups, where each group representation further includes a value of the categorical field corresponding to the field as defined in the interface as identified in FIG. 8. More specifically, for each bucket, a value for the categorical field (e.g., a category) is assigned, and a name and presentation characteristic (color) is shown in association with a representation of the group in the depicted interface. The representation can facilitate visually identifying system performance and investigating bad performance instances. Debugging may thus be facilitated.

While FIGS. 9A-9B shows an instance where a value for a categorical field is shown for each categorical group, it will be appreciated that categorical fields can additionally or alternatively be used to tailor the presentation and/or processing of individual log messages. Depending on the definition of a categorical field, a categorical field may apply specifically to log-message groups or to individual log messages or to both groups and individual messages. It will further be appreciated that a categorical field may, but need not, apply specifically to a particular source or type of log messages.

The interface may be configured to generate graphs for one or more statistics. In the instance depicted in FIGS. 10A-10B, three graphs are shown in response to user interactions (e.g., by clicking an option to add a chart and selecting a field, statistic or range or by dragging a representation of a field, statistic or range—such as a column heading—to a chart space). The three graphs correspond to the total-time statistic, summed database time statistic and the summed mid-tier time statistic. Each statistic is shown relative to an x-axis that corresponds to a start time for a transaction. The graphs are further binned. Clicking on a particular bucket results in highlighting portions of the graphs that correspond to a same transaction-time bin as is associated with the bucket, as shown in FIG. 10.

In the instance shown in FIG. 10, the response time for the log-message group is "terrible", and the graphical presentation can facilitate exploring why the response time was prolonged (e.g., by visually determining whether there are correlations between two or more plots). Specifically, the first graph shows the overall total time for the time bin is associated with a spike. The database time is rather consistent with neighboring time points (e.g., as shown in the second graph), but the mid-tier time was higher than neighboring time points (e.g., as shown in the third graph). The bottom blue line shows the number of queries associated with each time bin, which indicates that the system was not too heavily loaded at the highlighted time point.

In this instance, a user may explore whether the poor performance was associated by a particular host by adding a column to show a value for a Destination URL field. The table may further be sorted, such that a user may visually cluster "Terrible" ranges for a given statistic and determine whether there is a common value for another statistic or field.

Figure 10A:
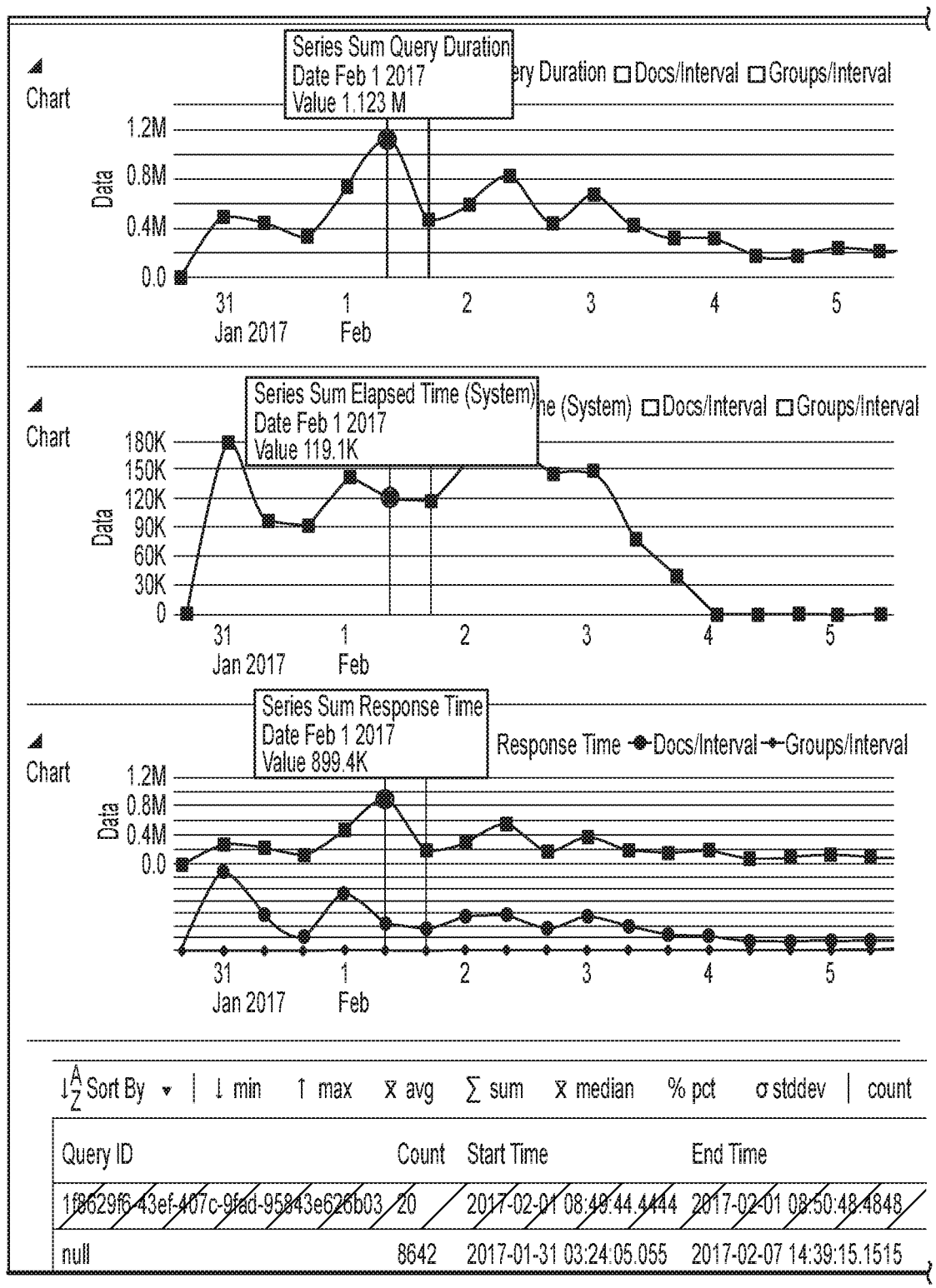
FIGS. 10A-10B shows an interface that includes time-series data for each of multiple log-message fields.
Figure 10B:
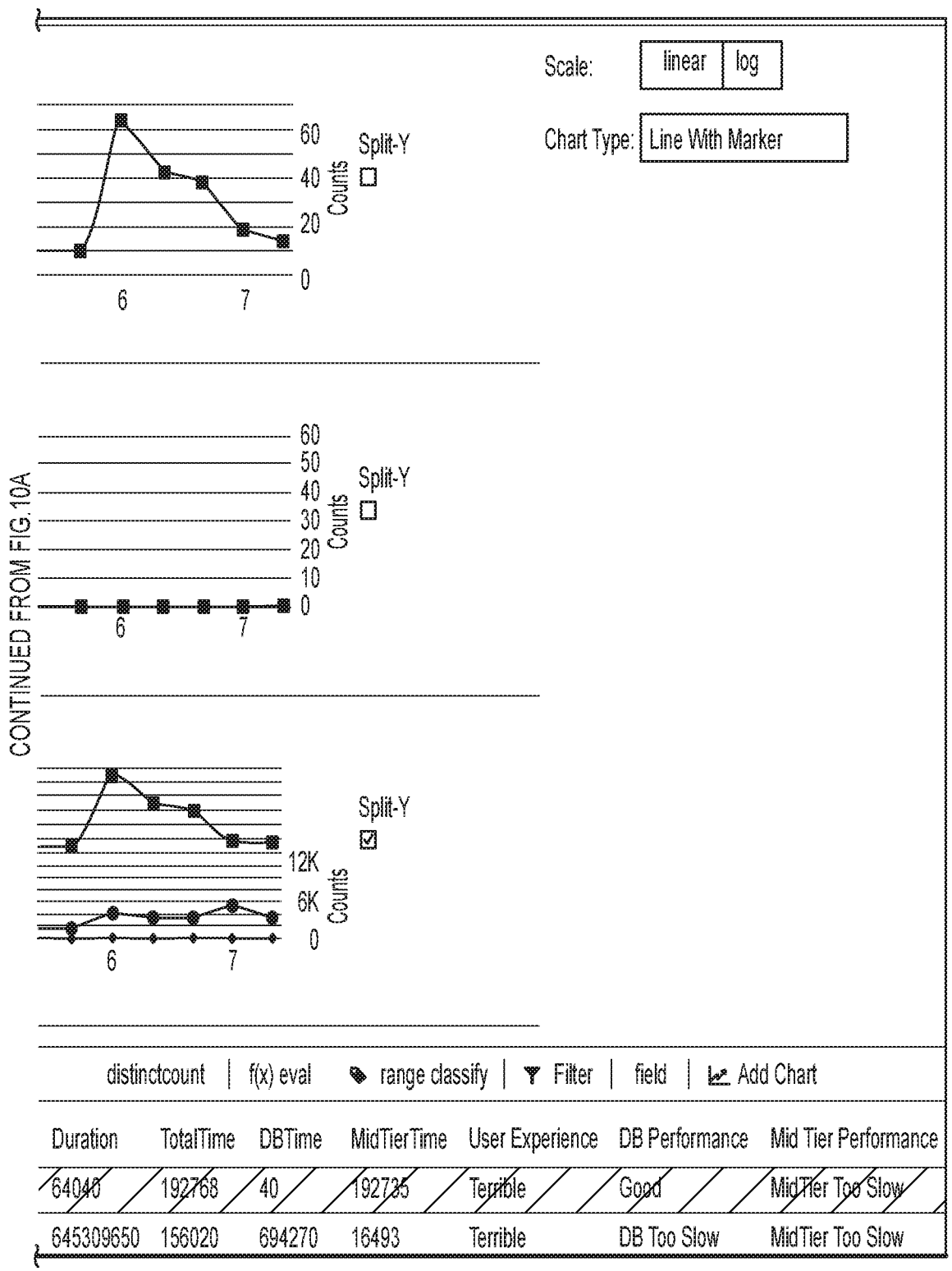

While FIGS. 10A-10B shows line charts, it will be appreciated that other types of charts are contemplated. For example, a scatter plot may be shown (e.g., where each point reflects a numeric value or range via its y-position). A scatter plot may—but need not—be binned. To illustrate, when plotting range values using a scatter plot, a dot may be colored and sized to represent a number of buckets having a particular range assignment, or separate points may be shown for each bucket.

As another example, a chart may include a pie chart (e.g., representing a portion of buckets with range results in each range), a sun chart or a distribution plot. In some instances, chart generation can capitalize on information about a data structure, such as whether and/or how one field value depends (e.g., based on a statistic definition) on another.

Thus, some disclosed techniques transform raw log files to interfaces that facilitate evaluating performance and detecting sources of poor performance. For example, the use of predefined signatures can facilitate identifying the types of field values in the messages, which can be identified in interfaces for defining statistics, ranges, and/or graphs. Field values can be used to derive new field values (e.g., categorical field values) for individual log messages or groups of log messages. Definitions of categorical fields can be at least partly identified via an automated processing and/or user input. Category values can facilitate generation of focused presentations, charts, statistics, performance review, etc. Categorical fields may be used even if log messages were generated using different applications and/or correspond to different formats or signatures (e.g., by mapping multiple components to a single identifier and/or defining a category using identifiers of multiple identifiers).

Figure 11:
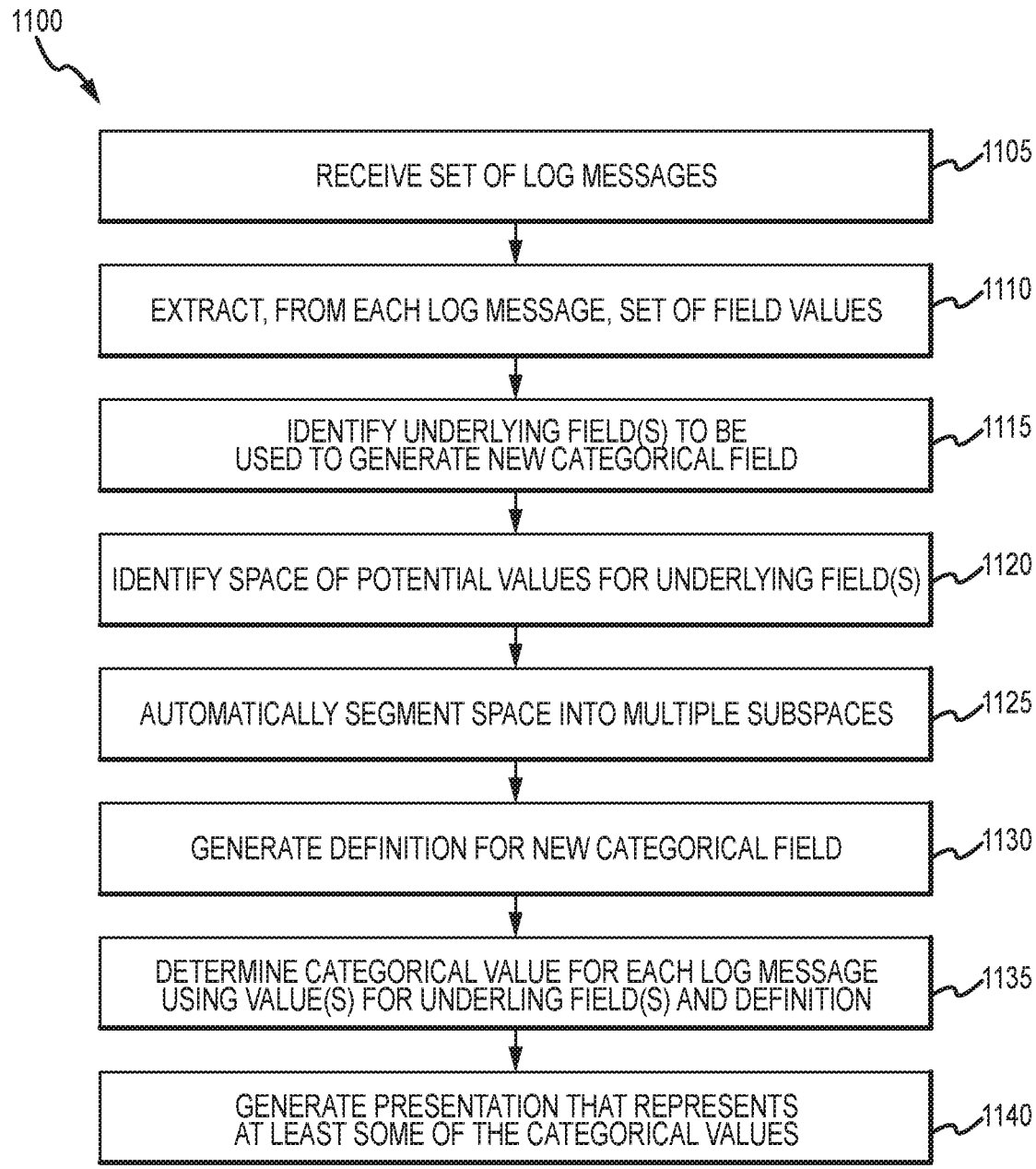
FIG. 11 shows a process for generating and presenting categorical values for log messages.

FIG. 11 shows a process for generating and presenting categorical values for log messages. At block 1105, a set of log messages is received. The set of log messages may be received from one or more data sources and/or from a local or remote data store. The set of log messages may be received in real-time (e.g., upon or immediately after a time at which they are generated) or at a subsequent time. The set of log messages may, but need not, correspond to different signatures, include values for different fields, and/or have different formats.

At block 1110, for each log message of the set of log messages, a set of field values is extracted from the log message. Each field value can correspond to a predefined, detected and/or new field. Extracting the field values can include, for example, parsing the log message to identify a value for each of a set of variable components. Extracting the field values can include using a signature to identify portions of the log message that correspond to the field values.

At block 1115, one or more underlying fields are identified. Each underlying of the underlying field(s) can correspond to a field for which at least one field value was extracted at block 1110. Identifying the one or more underlying fields can include identifying one or more variable components of a signature used to extract the field value(s). The underlying field(s) can be identified based on, for example, input detected from a user (e.g., that identifies the field(s)), an automated clustering technique (e.g., that identifies field(s) associated with distinct clusters), distribution analyses (e.g., that identifies multi-modal field(s)), etc. In some instances, the one or more underlying fields is a single field. In some instances, the one or more underlying fields includes multiple fields. The multiple fields may include multiple fields that may be present in a single log message (e.g., represented in a single signature) or fields that correspond to a same meaning but are represented differently in various log messages (e.g., corresponding to a first variable component in a first signature and a second variable component in a second signature).

At block 1120, a space of potential values is identified for the one or more underlying fields. The space of potential values can include, for example, identifying one or more bounds for each of the one or more underlying fields. In some instances, a bound can be open indicating that there is no lower or upper threshold or is unbounded in at least one direction. The space can be identified based on, for example, values for the one or more underlying fields from the set of log messages, values for the one or more underlying fields from a previous set of log messages, and/or a specification associated with the one or more underlying fields (e.g., identifying a potential range and having been associated with a particular field). For example, the space can be identified to range from a minimum value to a maximum value for the field (e.g., as detected within a current set of log messages, a previous set of log messages or all received log messages).

At block 1125, one or more specifications are automatically determined for each value subspace of a set of value subspaces. The specifications can be determined based on decision logic and the space of potential values. The specification can include one or more endpoints (e.g., thresholds) of a value range and/or a category name for the value subspace. A value range may be an open or closed range. For example, specifications can be defined such that a value range for a single underlying field is divided into three subspace ranges (e.g., two open-ended and one closed or three closed ranges). Each value subspace of the plurality of value subspaces can be associated with a category name. The category name can include, for example, a natural-language name, alphanumeric identifier, or numeric identifier. The category identifier can include an identifier to be presented in association with a category-assignment indicator or as a representation of assignment to the category.

The specifications can define the value subspaces to be wholly within the space of potential values. In some instances, the value subspaces are entirely non-overlapping with each other. In some instances, a combination of the set of value subspaces is the same as the space of potential values. Specifications can be divided by, for example, dividing the value space(s) into a predefined number of subspaces. The space division can be defined to parse the space into subspaces that are the same or substantially similar (e.g., plus/minus a rounding factor) with respect to a value range, a current number of log messages having a corresponding value in the subspace, a previous number of log messages having a corresponding value in the subspace, and/or an integral of a distribution (e.g., estimated based on previously and/or currently detected log-message field values) of values in the subspace.

At block 1130, the space is automatically segmented into multiple subspaces in accordance with the specifications. The segmenting can include identifying, for each underlying field of the one or more underlying fields and using the specification(s), one or more thresholds and/or a range, where each subspace is associated with a range and/or one or more thresholds. The segmenting can include identifying one or more value subspaces that are specified via logic commands. For example, a particular subspace may be defined to correspond to a first range for a first field and a second range for a second field. The subspace may be configured to effect an "AND" type of requirement, such a log message is to be associated with a categorical value of the space only if it corresponds to a first field value within the first range and a second field value within the second range. The subspace may alternatively be configured to effect an "OR" type of requirement, such a log message is to be associated with a categorical value of the subspace if it corresponds to a first field value within the first range or a second field value within the second range. This type of subspace definition may be particularly well-suited for instances when the set of log messages corresponds to multiple sources, signatures, component types, etc.

A number of subspaces into which the space is segmented and/or a number of value subspaces into which a value space is segmented may be, for example, set to a predefined number, identified based on user input (e.g., as part of a request to generate a categorical field), determined based on a number of clusters detected in a clustering technique (e.g., applied based on values for the one or more underlying fields from the set of log messages), set to a number of categories from a previously defined categorical field, etc. The subspaces may be defined based on, for example, a size of the space, a distribution of the field values for the one or more underlying fields from the set of log messages and/or one or more previous sets of log messages, one or more performance rules (e.g., identifying a target field value and/or an alert field value). For example, if the space includes values between 0-9, three subspaces may be defined to span 0-3, 3-6 and 6-9. As another example, a distribution can be generated that identifies a quantity of the set of log messages having a field value within each of a set of bins, and boundaries of the subspaces may be defined to account for a similar number of log messages in each subspace. As yet another example, the subspaces may be defined to have one subspace correspond to a primary normal part of the distribution and to have each other subspace correspond to each other (e.g., outlier) component of the distribution.

At block 1135, a definition for the new categorical field is generated. The definition can indicate how a categorical value of the new categorical field depends on one or more values of the one or more underlying fields. For example, the definition can associate a range (e.g., as partly or fully defined based on one or more of the specifications determined at block 1125) for each subspace with a particular categorical value (e.g., a category identifier, category name or other value). The new categorical field can be configured to be associated with any of a set of discrete values specified for the new categorical field. In some instances, the definition can be configured to transform one or more values set along a continuum (e.g., real numeric values) to a discrete value). The definition can be configured such that each discrete value of the set of discrete values is mapped to a value subspace of the plurality of value subspaces.

In some instances, a specification automatically determined for a value subspace for an underlying field at block 1125 includes a category name, and a subspace associated with the new categorical field corresponds to the value subspace. The particular categorical value may then be set to the automatically determined category name. In some instances, the particular categorical value is determined on multiple category names. For example, a categorical field can be defined to depend on multiple underlying fields. A category name for the categorical field may be defined to be (for example) a qualitatively worse (or better) category name as associated with values of underlying fields (e.g., "Poor performance"), a combination of category names as associated with values of underlying fields (e.g., "Fair processing speed, high memory usage"), and so on. In some instances, category names for the categorical field are automatically determined (e.g., for at least an initial definition). In some instances, category names are at least in part identified by user input.

Category names for the categorical field and/or category names for one or more underlying fields may be defined based on a known or inferred directionality of underlying values. A directionality can be set to indicate—for each of one, more or all underlying fields and/or for a categorical field—whether higher values for the underlying field represent a more positive operational characteristic compared to lower values for the underlying field or lower values for the underlying field represent a more positive operational characteristic compared to higher values for the underlying field. Upon identifying the directionality, an ordered set of qualitative category names can be associated with the ranges. For example, if a set of qualitative category names includes poor, fair and good performance, the three categories could be assigned either in this order or in a reverse order to three consecutive-range categories based upon the directionality. The directionality may be identified based on user input, a default setting (e.g., that determines that high numbers are associated with negative operational characteristics), a rule (e.g., that identifies low numbers as being associated with positive operational characteristics if it inferred that a field pertains to a time or resource usage and with negative operational characteristics otherwise), analysis of past metrics (e.g., that correlates values of a new underlying field with values of a characterized underlying field to determine whether the new underlying field shares a directionality with the characterized underlying field), a distribution analysis (e.g., where a rule indicates whether a longer and/or narrower tail or outlier characteristic is to be associated with more positive or negative operation characteristic), and so on. A configuration setting that is indicative of the directionality can be stored (e.g., in association with an identifier of a particular client, log-message source, underlying field, and/or categorical field). The configuration setting can be subsequently called to identify directionality and to influence a technique for assigning category names.

At block 1140, a categorical value for the new categorical field is determined for each log message in the set of log messages based on the definition and the one or more values of the one or more underlying fields extracted from the log message. For example, it can be determined which range contains a field value of the log message, and the categorical value can be identified as one corresponding to the range. The categorical value can be stored in association with an identifier of the log message.

At block 1145, a presentation is generated that represents, for each of at least some of the set of log messages, the categorical value the log message. For example, the presentation may include, for each of the at least some of the set of log messages, one or more extracted field values (which may, but need not, include value(s) for the underlying field(s) and/or which may, but need not, include one or more field values corresponding to one or more fields other than the underlying field(s)). The categorical value may be presented in spatial association with the extracted field value(s). In some instances, the categorical value can be presented in association with a graphical marking that indicates a degree to which the one or more underlying field values for the message correspond to a positive operational characteristic. For example, colors, sizes or font widths of a category name may be set based on where a corresponding categorical value falls along a spectrum of potential categorical values (e.g., with "good" performance being shown in blue text, "fair" performance being shown in green text, and "poor" performance being shown in red text).

As another example, the presentation may include, for each of the at least some of the set of log messages, the log message itself presented in spatial association with the extracted field. The presentation may be configured to receive input corresponding to a request to sort or filter the log-message representations (e.g., field values or log messages) based on the categorical field. The presentation can be configured to represent population data. For example, the presentation may identify a partial or full distribution of the categorical values (e.g., indicating a number or percentage of the set of log messages having been associated with each of one, more or all of the potential categorical values).

Process 1100 can further include facilitating a display of the presentation on a user device, which can include (for example) transmitting the presentation to the user device. The user device can be a same device as one from which a request to generate the categorical field was detected.

In some instances, a representation of the definition for the new categorical field can be presented at the user device (e.g., before, after or during the presentation representing the categorical values). An interface representing the definition can be configured to receive input that modifies the definition. For example, the interface may be configured to receive input that modifies a threshold that defines a value range for each of one or more subspaces. As another example, the interface may be configured to receive input that modifies a number of potential subspaces/categories. In various instances, the categorical values determined at block 1135 and represented at block 1140 may be determined based on the modified definition, or the values and representation may be updated based on the modified definition (e.g., such that the presentation is changed or a new presentation is displayed).

While process 1100 relates to assigning categorical values to individual log messages, it will be appreciated that categorical values can instead or additionally be assigned to log-message groups. The categorical values may be generated based on a group field that may correspond to a statistic generated for each group based on one or more values extracted from individual log messages assigned to the group. For example, an "average time" field can be generated for each group that is defined to be a mean of a processing-time variable component of messages assigned to the group, and a categorical field can be defined to transform the average time field value into a "slow", "normal" or "fast" categorical value. Space segmenting and initial field defining may be performed automatically and in manners disclosed herein.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising: receiving a plurality of log messages, wherein each log message of the plurality of log messages was generated by a host device of a plurality of host devices;
identifying, from the plurality of log messages, a set of underlying fields for generating a new categorical field, wherein the set of underlying fields indicate one or more data fields that are processed to generate a categorical value of the new categorical field;
identifying a space of potential values for the set of underlying fields;
determining, based on decision logic a plurality of value subspaces for the space of potential values;
defining a specification for each value subspace of the plurality of value subspaces to include a category name that identifies an operational characteristic corresponding to the plurality of host devices, the space of potential values including the plurality of value subspaces;
associating, for each value subspace of the plurality of value subspaces the value subspace with a category name, in accordance with a specification corresponding to the value subspace;
generating the new categorical field based on the set of underlying fields;
generating a definition for the new categorical field, the definition indicating how a categorical value of the new categorical field depends on one or more values of the set of underlying fields, the new categorical field being configured to be associated with any of a set of values specified for the new categorical field, each value of the set of values corresponding to a particular category name associated with a value subspace of the plurality of value subspaces;
for each log message of the plurality of log messages:
extracting the one or more values from the log message;
determining a categorical value for the new categorical field based on the definition and the extracted one or more values, the categorical value being one of the set of values; and
storing the categorical value in association with an identifier of the log message;
generating a presentation that represents, for each of at least some of the plurality of log messages, the particular category name corresponding to the categorical value determined for the log message:

facilitating a display of the presentation on a user device;
identifying, from the plurality of log messages, one or more log messages, wherein each of the one or more log messages corresponds to a particular category name associated with the new categorical field;
selecting, from the plurality of host devices, a host device that corresponds to the one or more log messages;
identifying, for each of the one or more log messages, a corresponding categorical value of the new categorical field;
determining based on the categorical values of the one or more log messages, a corrective action to be performed on the selected host device; and
transmitting, to the selected host device, one or more programmable instructions that represent the corrective action, wherein the one or more programmable instructions are executed by the selected host device.

2. The method as recited in claim 1, wherein:
the presentation includes, for each log message of the at least some of the plurality of log messages, a graphical marking for the particular category name that indicates a degree to which the one or more values of the set of underlying fields extracted from the log message correspond to a positive operational characteristic.

3. The method as recited in claim 2, further comprising:
determining, for the new categorical field, a directionality that indicates whether, for each underlying field of the set of underlying fields:
higher values for the underlying field represent a more positive operational characteristic compared to lower values for the underlying field; or
lower values for the underlying field represent a more positive operational characteristic compared to higher values for the underlying field; and
storing a configuration setting in accordance with the directionality, wherein the graphical markings are configured in accordance with the configuration setting.

4. The method as recited in claim 1, further comprising:
generating an interface that represents the definition for the new categorical field, wherein the interface indicates, for each value subspace of the plurality of value subspaces:
a subspace definition of the value subspace; and
a value range that corresponds to the value subspace;
receiving an indication that input has been received at the interface that corresponds to a request to modify the specification of each of at least one of the plurality of value subspaces, the request identifying a different endpoint or category name;
modifying the definition for the new categorical field in accordance with the request;
for each log message of at least some of the plurality of log messages:
determining an updated categorical value for the new categorical field based on the modified definition and the one or more values of the set of underlying fields extracted from the log message; and
storing the updated categorical value in association with an identifier of the log message;
generating an updated presentation that represents, for each of the at least some of the plurality of log messages, the updated categorical value the log message; and
facilitating a display of the updated presentation on the user device.

5. The method as recited in claim 4, wherein:
the interface indicates, for each value subspace of the plurality of value subspaces, the subspace definition of the value subspace by identifying an endpoint of the value range, the subspace definition of the value subspace being configured such that the value indicates that a value of the underlying field is within the value range; and
receiving the indication that input has been received at the interface that corresponds to the request to modify the definition for the new categorical field includes receiving an indication that input has been received at the interface that corresponds to a request to modify at least one of the endpoints of the value ranges for a value subspace of the plurality of value subspaces.

6. The method as recited in claim 1, further comprising:
receiving a request from the user device to sort the plurality of log messages based on the categorical values for the new categorical field;
generating an order for the plurality of log messages based on the categorical values for the new categorical field;
updating the presentation such that a same at least some or different at least some of the plurality of log messages are presented in accordance with the order; and
facilitating an updated display of the updated presentation on the user device.

7. The method as recited in claim 1, further comprising:
generating one or more statistical values for the plurality of log messages based on the categorical values associated with the plurality of log messages, the one or more statistical values including a statistic or distribution, wherein the presentation includes the one or more statistical values;
wherein the presentation includes the one or more statistical values.

8. The method as recited in claim 1, further comprising:
segmenting the plurality of log messages into a set of groups, wherein, for each group of the set of groups, a same field value was extracted for each log message associated with the group, the same field value corresponding to a grouping field;
identifying a set of group fields to characterize events assigned to each group, each group field of the set of group fields including or being based on fields of log messages, wherein:
at least one of the set of groups fields includes the new categorical field; or
the grouping field includes the new categorical field;
generating, for each group of the set of groups and for each group field of the set of group fields, a group-field value for the group field and group;
generating a second presentation that represents, for each group of at least some of the set of groups, a value for each of the set of group fields; and
facilitating a display of the second presentation on the user device.

9. The method as recited in claim 1, wherein:
the plurality of log messages includes:
a first set of log messages that correspond to a first signature that identifies first relative positions of a first set of components, the first set of components including one or more first variable components that indicate a range of numerical values for a virtual field to associate with the first set of log messages and one or more first non-variable components that indicate a set of non-numerical labels for a virtual field to associate with the log message; and a second set of log messages that correspond to a second signature that identifies second relative positions of a second set of components, the second set of components including one or more second variable components and one or more second non-variable components; and at least one underlying field of the set of underlying fields include a first field corresponding to a first variable component of the one or more first variable components and a second field corresponding to a second variable component of the one or more second variable components.

10. A computer-program product tangibly embodied in a non-transitory machine-readable storage medium, including instructions configured to cause one or more data processors to perform actions including:

receiving a plurality of log messages, wherein each log message of the plurality of log messages was generated by a host device of a plurality of host devices;

identifying, from the plurality of log messages, a set of underlying fields for generating a new categorical field, wherein the set of underlying fields indicate one or more data fields that are processed to generate a categorical value of the new categorical field;

identifying a space of potential values for the set of underlying fields;

determining, based on decision logic, a plurality of value subspaces for the space of potential values;

defining a specification for each value subspace of the plurality of value subspaces to include a category name that identifies an operational characteristic corresponding to the plurality of host devices, the space of potential values including the plurality of value subspaces;

associating, for each value, subspace of the plurality of value subspaces, the value subspace with a category name, in accordance with a specification corresponding to (the value subspace;

generating the new categorical field based on the set of underlying fields;

generating a definition for the new categorical field, the definition indicating how a categorical value of the new categorical field depends on one or more values of the set of underlying fields, the new categorical field being configured to be associated with any of a set of values specified for the new categorical field, each value of the set of values corresponding to a particular category name associated with a value subspace of the plurality of value subspaces;

for each log message of the plurality of log messages:
extracting the one or more values from the log message;
determining a categorical value for the new categorical field based on the definition and the extracted one or more values, the categorical value being one of the set of values; and
storing the categorical value in association with an identifier of the log message;

generating a presentation that represents, for each of at least some of the plurality of log messages, the particular category name corresponding to the categorical value determined for the log message;

facilitating a display of the presentation on a user device;

identifying, from the plurality of log messages, one or more log messages, wherein each of the one or more log messages corresponds to a particular category name associated with the new categorical field;

selecting, from the plurality of host devices, a host device that corresponds to the one or more log messages;

identifying, for each of the one or more log messages, a corresponding categorical value of the new categorical field determining, based on the categorical values of the one or more log messages, a corrective action to be performed on the selected host device; and transmitting, to the selected host device, one or more programmable instructions that represent the corrective action, wherein the one or more programmable instructions are executed by the selected host device.

11. The computer-program product as recited in claim 10, wherein:

the presentation includes, for each log message of the at least some of the plurality of log messages, a graphical marking for the particular category name that indicates a degree to which the one or more values of the set of underlying fields extracted from the log message correspond to a positive operational characteristic.

12. The computer-program product as recited in claim 11, wherein the actions further include:

determining, for the new categorical field, a directionality that indicates whether, for each underlying field of the set of underlying fields:

higher values for the underlying field represent a more positive operational characteristic compared to lower values for the underlying field; or lower values for the underlying field represent a more positive operational characteristic compared to higher values for the underlying field; and storing a configuration setting in accordance with the directionality, wherein the graphical markings are configured in accordance with the configuration setting.

13. The computer-program product as recited in claim 10, wherein the actions further include:

generating an interface that represents the definition for the new categorical field, wherein the interface indicates, for each value subspace of the plurality of value subspaces:
a subspace definition of the value subspace; and
a value range that corresponds to the value subspace;

receiving an indication that input has been received at the interface that corresponds to a request to modify the specification of each of at least one of the plurality of value subspaces, the request identifying a different endpoint or category name;

modifying the definition for the new categorical field in accordance with the request;

for each log message of at least some of the plurality of log messages:
determining an updated categorical value for the new categorical field based on the modified definition and the one or more values of the set of underlying fields extracted from the log message; and
storing the updated categorical value in association with an identifier of the log message;

generating an updated presentation that represents, for each of the at least some of the plurality of log messages, the updated categorical value the log message; and facilitating a display of the updated presentation on the user device.

14. The computer-program product as recited in claim 13, wherein:
the interface indicates, for each value subspace of the plurality of value subspaces, the subspace definition of the value subspace by identifying an endpoint of the value range, the subspace definition of the value subspace being configured such that the value indicates that a value of the underlying field is within the value range; and
receiving the indication that input has been received at the interface that corresponds to the request to modify the definition for the new categorical field includes receiving an indication that input has been received at the interface that corresponds to a request to modify at least one of the endpoints of the value ranges for a value subspace of the plurality of value subspaces.

15. The computer-program product as recited in claim 10, wherein the actions further include:
receiving a request from the user device to sort the plurality of log messages based on the categorical values for the new categorical field;
generating an order for the plurality of log messages based on the categorical values for the new categorical field;
updating the presentation such that a same at least some or different at least some of the plurality of log messages are presented in accordance with the order; and
facilitating an updated display of the updated presentation on the user device.

16. The computer-program product as recited in claim 10, wherein the actions further include:
generating one or more statistical values for the plurality of log messages based on the categorical values associated with the plurality of log messages, the one or more statistical values including a statistic or distribution, wherein the presentation includes the one or more statistical values;
wherein the presentation includes the one or more statistical values.

17. The computer-program product as recited in claim 10, wherein the actions further include:
segmenting the plurality of log messages into a set of groups, wherein, for each group of the set of groups, a same field value was extracted for each log message associated with the group, the same field value corresponding to a grouping field;
identifying a set of group fields to characterize events assigned to each group, each group field of the set of group fields including or being based on fields of log messages, wherein:
at least one of the set of groups fields includes the new categorical field; or
the grouping field includes the new categorical field;
generating, for each group of the set of groups and for each group field of the set of group fields, a group-field value for the group field and group;
generating a second presentation that represents, for each group of at least some of the set of groups, a value for each of the set of group fields; and
facilitating a display of the second presentation on the user device.

18. The computer-program product as recited in claim 10, wherein:
the plurality of log messages includes:
a first set of log messages that correspond to a first signature that identifies first relative positions of a first set of components, the first set of components including one or more first variable components that indicate a range of numerical values for a virtual field to associate with the first set of log messages and one or more first non-variable components that indicate a set of non-numerical labels for a virtual field to associate with the log message; and
a second set of log messages that correspond to a second signature that identifies second relative positions of a second set of components, the second set of components including one or more second variable components and one or more second non-variable components; and
at least one underlying field of the set of underlying fields include a first field corresponding to a first variable component of the one or more first variable components and a second field corresponding to a second variable component of the one or more second variable components.

19. A system comprising:
a plurality of host devices connected through a communication network, wherein the communication network includes one or more gateways;
a log analytics subsystem configured to communicate with the plurality of host devices via the one or more gateways, the log analytics subsystem comprising:
one or more data processors; and
a non-transitory computer readable storage medium containing instructions which when executed on the one or more data processors, cause the one or more data processors to perform actions including:
receiving a plurality of log messages, wherein each log message of the plurality of log messages was generated by a host device of the plurality of host devices;
identifying, from the plurality of log messages, a set of underlying fields for generating a new categorical field, wherein the set of underlying fields indicate one or more data fields that are processed to generate a categorical value of the new categorical field;
identifying a space of potential values for the set of underlying fields;
determining, based on decision logic, a plurality of value subspaces for the space of potential values;
defining a specification for each value subspace of the plurality of value subspaces to include a category name that identifies an operational characteristic corresponding to the plurality of host devices, the space of potential values including the plurality of value subspaces;
associating, for each value subspace of the plurality of value subspaces, the value subspace with a category name in accordance with a specification corresponding to the value subspace;
generating the new categorical field based on the set of underlying fields;
generating a definition for the new categorical field, the definition indicating how a categorical value of the new categorical field depends on one or more values of the set of underlying fields, the new categorical field being configured to be associated with any of a set of values specified for the new categorical field, each value of the set of values corresponding to a particular category name associated with a value subspace of the plurality of value subspaces;

for each log message of the plurality of log messages:
- extracting the one or more values from the log message;
- determining a categorical value for the new categorical field based on the definition and the extracted one or more values, the categorical value being one of the set of values; and
- storing the categorical value in association with an identifier of the log message;

generating a presentation that represents, for each of at least some of the plurality of log messages, the particular category name corresponding to the categorical value determined for the log message;

facilitating a display of the presentation on a user device;

identifying, from the plurality of log messages, one or more log messages, wherein each of the one or more log messages corresponds to a particular category name associated with the new categorical field;

selecting, from the plurality of host devices, a host device that corresponds to the one or more log messages;

identifying, for each of the one or more log messages, a corresponding categorical value of the new categorical field;

determining, based on the categorical values of the one or more log messages, a corrective action to be performed on the selected host device; and transmitting, to the selected host device, one or more programmable instructions that represent the corrective action, wherein the one or more programmable instructions are executed by the selected host device.

20. The system as recited in claim 19, wherein:

the presentation includes, for each log message of the at least some of the plurality of log messages, a graphical marking for the particular category name that indicates a degree to which the one or more values of the set of underlying fields extracted from the log message correspond to a positive operational characteristic.

\* \* \* \* \*